US011364885B2

(12) United States Patent
Viele

(10) Patent No.: US 11,364,885 B2
(45) Date of Patent: Jun. 21, 2022

(54) SMART TRAILER CONTROLLER

(71) Applicant: Vieletech Inc., Florissant, CO (US)

(72) Inventor: Matthew Viele, Florissant, CO (US)

(73) Assignee: Vieletech Inc., Florissant, CO (US)

( * ) Notice: Subject to any disclaimer, the term of this patent is extended or adjusted under 35 U.S.C. 154(b) by 77 days.

(21) Appl. No.: 16/251,565

(22) Filed: Jan. 18, 2019

(65) Prior Publication Data

US 2019/0217831 A1 Jul. 18, 2019

Related U.S. Application Data

(60) Provisional application No. 62/618,754, filed on Jan. 18, 2018.

(51) Int. Cl.
*B60D 1/30* (2006.01)
*B60T 8/17* (2006.01)
(Continued)

(52) U.S. Cl.
CPC ............ *B60T 8/1708* (2013.01); *B60D 1/245* (2013.01); *B60D 1/30* (2013.01); *B60D 1/62* (2013.01);
(Continued)

(58) Field of Classification Search
CPC ...... B60T 8/1708; B60T 8/171; B60T 8/1725; B60T 2270/406; B60T 2230/06;
(Continued)

(56) References Cited

U.S. PATENT DOCUMENTS

| 3,937,292 A | 2/1976 | Kincaid, Jr. |
| 4,502,557 A | 3/1985 | Anderson |
| 4,897,642 A * | 1/1990 | DiLullo ................ B60R 25/102 235/385 |
| 5,295,551 A | 3/1994 | Sukonick |
| 5,330,020 A | 7/1994 | Ketcham |

(Continued)

FOREIGN PATENT DOCUMENTS

DE 10-2017000289 A1 1/2017
SE 539 530 C2 10/2017

OTHER PUBLICATIONS

YouTube video entitled "Autorestomod Review of RetroSound Model Two Classic Car Radio," uploaded on Jan. 18, 2013 by user Retro Manufacturing, LLC. Retrieved from the Internet on Sep. 24, 2020 < https://www.youtube.com/watch?v=X2aetJuO0D4>) (Year: 2013).*

(Continued)

*Primary Examiner* — Donald J Wallace
*Assistant Examiner* — Daniel M. Robert
(74) *Attorney, Agent, or Firm* — Woodard, Emhardt, Henry, Reeves & Wagner, LLP

(57) ABSTRACT

A vehicle system includes a head vehicle and a tail vehicle that is towed by the head vehicle. Together the head vehicle and tail vehicle have a control subsystem for controlling among other things braking of the tail vehicle. The control subsystem includes a head unit in the head vehicle and a tail unit in the tail vehicle. The head unit further includes a head Inertial Measurement Unit ("IMU") for measuring orientation and acceleration of the head vehicle, and the tail unit includes a tail IMU for measuring orientation and acceleration of the tail vehicle. With the IMUs, the control subsystem is able to determine relative pitch and orientation of the head vehicle and tail vehicle to control braking and reduce the risk of jackknifing. The tail unit further has wheel speed sensors and a Tire-Pressure Monitoring System ("TPMS") for sensing wheel speed.

47 Claims, 15 Drawing Sheets

(51) Int. Cl.
  *B60T 8/172* (2006.01)
  *G07C 5/08* (2006.01)
  *B60D 1/64* (2006.01)
  *B60T 8/171* (2006.01)
  *B60D 1/24* (2006.01)
  *B60D 1/62* (2006.01)
  *G07C 5/00* (2006.01)

(52) U.S. Cl.
  CPC .............. *B60D 1/64* (2013.01); *B60T 8/171* (2013.01); *B60T 8/1725* (2013.01); *G07C 5/0808* (2013.01); *G07C 5/0816* (2013.01); *B60T 2230/06* (2013.01); *B60T 2270/406* (2013.01); *G07C 5/008* (2013.01)

(58) Field of Classification Search
  CPC .... G07C 5/0808; G07C 5/0816; G07C 5/008; B60D 1/30; B60D 1/245; B60D 1/62; B60D 1/64
  See application file for complete search history.

(56) References Cited

U.S. PATENT DOCUMENTS

| | | | | |
|---|---|---|---|---|
| 5,394,924 | A * | 3/1995 | Rejc | E05D 15/24 160/201 |
| 5,397,924 | A * | 3/1995 | Gee | B60D 1/62 280/422 |
| 5,434,552 | A * | 7/1995 | Ems | B60D 1/06 280/432 |
| 5,739,592 | A * | 4/1998 | Rigsby | B60D 1/62 280/422 |
| 5,780,732 | A * | 7/1998 | Gieseler | B60T 8/343 73/121 |
| 6,012,780 | A * | 1/2000 | Duvernay | B60T 7/20 188/112 R |
| 6,222,443 | B1 | 4/2001 | Beeson et al. | |
| 6,419,037 | B1 | 7/2002 | Kramer et al. | |
| 6,494,476 | B2 | 12/2002 | Masters et al. | |
| 6,553,288 | B2 | 4/2003 | Taguchi et al. | |
| 7,115,070 | B2 | 10/2006 | Stummer | |
| 7,118,513 | B2 | 10/2006 | Stummer | |
| 7,397,363 | B2 * | 7/2008 | Joao | B60R 25/102 340/539.11 |
| 7,514,803 | B2 | 4/2009 | Wilks | |
| 9,270,627 | B1 | 2/2016 | Koo | |
| 9,550,399 | B2 | 1/2017 | Jones et al. | |
| 9,738,125 | B1 * | 8/2017 | Brickley | B60D 1/26 |
| 9,956,965 | B1 * | 5/2018 | Hall | B60W 50/14 |
| 10,007,271 | B2 | 6/2018 | Amla et al. | |
| 10,108,202 | B1 | 10/2018 | Aikin et al. | |
| 2001/0039230 | A1 | 11/2001 | Severinsky et al. | |
| 2004/0181317 | A1 * | 9/2004 | Flechtner | B60W 40/13 701/1 |
| 2007/0222183 | A1 | 9/2007 | Daniel | |
| 2009/0093928 | A1 * | 4/2009 | Getman | B60T 8/1708 701/37 |
| 2010/0070149 | A1 * | 3/2010 | Fry | B60T 8/17554 701/70 |
| 2010/0158629 | A1 * | 6/2010 | Morland | B60P 7/0861 410/98 |
| 2011/0287888 | A1 | 11/2011 | Muller et al. | |
| 2013/0041576 | A1 | 2/2013 | Switkes et al. | |
| 2013/0253814 | A1 * | 9/2013 | Wirthlin | G01L 11/025 701/124 |
| 2013/0338848 | A1 * | 12/2013 | Park | G01C 9/06 701/1 |
| 2014/0054098 | A1 | 2/2014 | Ferri | |
| 2015/0137482 | A1 * | 5/2015 | Woolf | B60D 1/62 280/448 |
| 2015/0165850 | A1 * | 6/2015 | Chiu | B60D 1/62 701/41 |
| 2015/0367844 | A1 * | 12/2015 | Tagesson | B60T 8/1708 701/41 |
| 2016/0039456 | A1 * | 2/2016 | Lavoie | B60D 1/62 701/41 |
| 2016/0049020 | A1 * | 2/2016 | Kuehnle | G06T 7/75 701/34.4 |
| 2016/0221492 | A1 | 8/2016 | Stender et al. | |
| 2016/0244039 | A1 * | 8/2016 | Rizzo | B60T 8/322 |
| 2016/0257341 | A1 * | 9/2016 | Lavoie | B60W 10/18 |
| 2016/0337322 | A1 | 11/2016 | Kang et al. | |
| 2017/0089697 | A1 * | 3/2017 | Shepard | G01B 21/22 |
| 2017/0168504 | A1 | 6/2017 | Darms et al. | |
| 2017/0287320 | A1 * | 10/2017 | Meade | G08C 17/02 |
| 2017/0305436 | A1 * | 10/2017 | Maskell | B60W 30/02 |
| 2018/0037261 | A1 * | 2/2018 | Shepard | B62D 13/06 |
| 2018/0061239 | A1 | 3/2018 | Prasad et al. | |
| 2018/0099712 | A1 * | 4/2018 | Bean | H04L 12/2803 |
| 2018/0239362 | A1 | 8/2018 | Amla et al. | |
| 2019/0047346 | A1 * | 2/2019 | Carpenter | B60G 17/0155 |
| 2019/0084537 | A1 * | 3/2019 | Kasper | B60T 8/17551 |
| 2019/0187716 | A1 | 6/2019 | Cantrell et al. | |
| 2019/0217674 | A1 * | 7/2019 | Schutt | B60D 1/30 |
| 2020/0047579 | A1 * | 2/2020 | Crooks | B60G 17/017 |
| 2020/0198596 | A1 | 6/2020 | Houle | |
| 2020/0384818 | A1 * | 12/2020 | Giaier | B60D 1/248 |

OTHER PUBLICATIONS

Retro Manufacturing (see YouTube video entitled "Autorestomod Review of RetroSound Model Two Classic Car Radio," uploaded on Jan. 18, 2013 by user Retro Manufacturing, LLC. Retrieved from the Internet on Sep. 24, 2020 <https://www.youtube.com/watch?v=X2aetJuO0D4>.) (Year: 2013).*

* cited by examiner

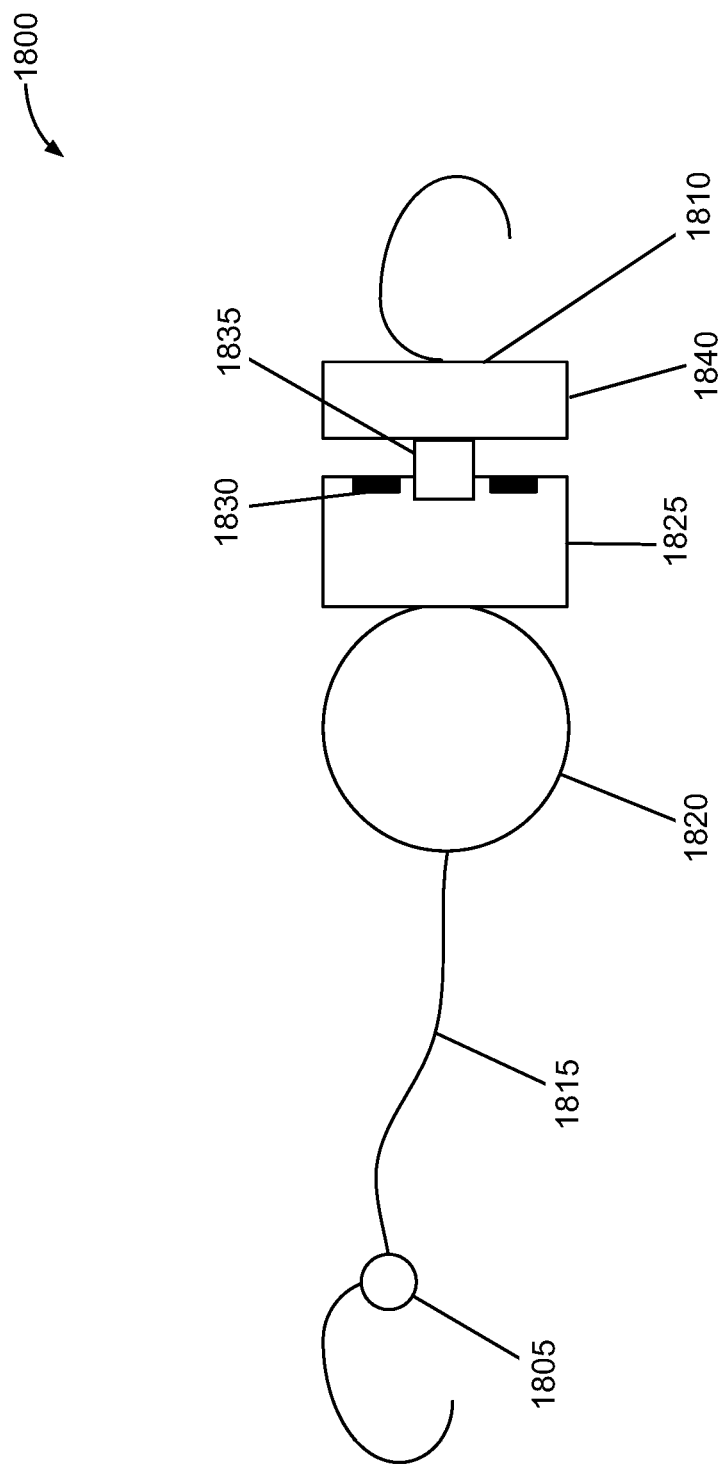

SMART TRAILER CONTROLLER

CROSS-REFERENCE TO RELATED APPLICATION

This application claims the benefit of U.S. Provisional Patent Application No. 62/618,754, filed on Jan. 18, 2018, which is hereby incorporated by reference.

BACKGROUND

Towing vehicles, such as trailers, campers, and the like, can be a difficult experience, especially when riding under problematic road conditions. For example, if the brakes between the towing vehicle and trailer are not properly calibrated the trailer can cause the towing vehicle to be pushed, pulled, swerved, or even jackknifed. This instability can be unnerving. Even when the braking systems of the towing vehicle and trailer are calibrated on level ground, this calibration is usually ineffective when travelling down steep inclines and/or during snowy conditions. Backing up trailers can also be difficult due to the risk of striking objects or jackknifing. Trailer or camper theft is also a significant problem.

Thus, there is a need for improvement in this field.

SUMMARY

A unique vehicle system has been developed to address the above-mentioned as well as other issues. The vehicle system includes a tow or head vehicle and one or more tail vehicles that are towed by the head vehicle. The tow or head vehicle can for example include an automobile or truck, and the tail vehicles can include trailers. Together the head vehicle and tail vehicle have a control subsystem for controlling among other things braking of the tail vehicle. The control subsystem includes a head unit in the head vehicle and a tail unit in the tail vehicle. In some instances, the tow or head vehicle along with one or more of the trailers can correspond to a head unit controller, and the trailers can each have one or more tail units. The head unit further includes a head Inertial Measurement Unit ("IMU") for measuring orientation and acceleration of the head vehicle, and the tail unit includes a tail IMU for measuring orientation and acceleration of the tail vehicle. With the IMUs, the control subsystem is able to determine relative pitch and orientation of the head vehicle and tail vehicle to control braking and reduce the risk of jackknifing. The tail unit further has wheel speed sensors and a Tire-Pressure Monitoring System ("TPMS") with TPMS sensors for sensing wheel speed in addition to tire pressure. The tail unit is configured to independently control the brakes of the tail vehicle. By monitoring the wheel speed of each trailer wheel, the control subsystem is able to detect individual wheel lock up by detecting that the corresponding trailer wheels is not moving. When wheel lock up occurs, the tail unit is able to independently release the brake to prevent skidding of the trailer wheel. The force applied to each brake can be different to compensate for brake wear. The control subsystem is further designed to facilitate a multi-trailer mode where more than one trailer is being towed. Moreover, the control subsystem is able to detect when devices that are not compatible with the system are attached and make appropriate changes in functionality. The vehicle system further includes an auto-brake feature in which a parking sensor array is used to prevent the chassis front striking objects while moving. The vehicle system further includes a unique anti-theft detection system.

Among other things, the control subsystem supports the following functions and features, including:
  Auto-brake when an obstacle is detected;
  Stability control for both single trailer and multi-trailer;
  Read wheel speed from Hall or TPMS sensors;
  Alerts head unit if a fault has occurred;
  Alerts head unit if an optional motion or other sensor has occurred;
  Performs anti-theft detection if improper head unit is connected;
  Tongue weight detection;
  Brake balancing by using trailer pitch;
  Jackknife detection/warning; and
  Crawl control for assistance on steep descents.

Among other things, the head unit supports the following functions and features, including:
  Split control box and interface.
  Pre-made blank buttons for some standard interfaces.
  Bluetooth® or other wireless connectivity to a phone, tablet, or other wireless devices to interface with advanced features.
  Some new trucks incorporate brake controllers in the dash already. In these cases, the head unit can operate with a dummy load and intercept the brake controller then apply advanced commands to the trailer.

It should be noted that a split box interface lets the controller to be hidden under the dash and either add some holes in the panel for the buttons or replace some of the blank buttons on the dash. In one particular embodiment, the head unit is a superset of a conventional brake controller. For example, the head unit can further perform trailer braking with a conventional trailer. If needed, the head unit provides conventional connected and braking intensity outputs. The head unit further has sensitivity adjustment and a "force brake" button like a conventional brake controller.

Among other things, the tail unit supports the following functions and features, including:
  Independent control of all brakes;
  Hall sensor interface to all wheels;
  Connector plug to car (or a head trailer);
  Connector socket to rear trailer;
  RF Interface to the TPMS;
  CAN connection to additional devices;
  CAN interface for a second trailer;
  Smart battery disconnect;
  Detection and override circuit for standard brake unit; and
  Provides a BroadR hub to interface normal wired IP cameras to vehicle.

In one particular embodiment, the tail unit is built around a low-cost microcontroller (e.g., Microchip Sam C21, 32-bit ARM micro). This is packaged in a waterproof box (IP67) and is intended to be mounted to the frame of the trailer.

It should be appreciated that various stages may be referenced herein. As used herein, stages 1 and 2 may provide a smart trailer controller. The stage 1 type system may include smart trailer brakes, electric trailer axles, mechanically coupled tow vehicles, and semi-autonomous tow vehicles may be provided. It should be appreciated that dual, solid, axle leaf springs may be utilized in embodiments of the present disclosure. Smart trailer brakes may replace a standard brake controller and may operate with a smart box on the trailer to perform smart functions including, but not limited to, differential braking including stability control, backup control, multi-trailer backup, tire pressure monitoring, door closure detection, load movement detection, proximity detection, orientation display, and jackknife warning. It should be appreciated that load movement detection may provide a string and magnet where once the magnet is removed from the device, alerts of load movement may be provided to users. It should also be appreciated that proximity detection may include conventional ultrasonic backup sensors, and top-mounted ultrasonic sensors may be provided on the front and back of brakes that may automatically actuate brakes to prevent hitting overhangs. It should further be appreciated that proximity detection may provide automatic braking and removable ultrasonic sensors that may attach to tall equipment on flatbeds. It should be appreciated that communication may be made over an existing 4-pin or 7-pin trailer plug. It should be appreciated that standard pin connectors may be utilized and may not require new wiring for trucks and trailers. It should also be appreciated that a backwards compatible plug may be compatible with a "dumb" vehicle or trailer. It should be appreciated that a "dumb" vehicle may refer to a traditional vehicle, non-autonomous vehicle, two-vehicles, or a trailer. Network communication for slow data rates may be provided, such as for vehicle dynamics and braking. It should be appreciated that a smart trailer brakes communication system may support fast network communication using the same or additional pins for fast data like cameras and radar.

The stage 2 type system may provide electronic trailer axles that may integrate axles and wheel motors. Electronic trailer axles maybe utilized for stability control, and motors may be sized and geared for parking. For example, curb hopping requires a significant amount of torque and little speed. It should be appreciated that a 2-speed gearbox may be utilized for highway use. Electronic trailer axles may be sealed, fully waterproof, and submersible in up to approximately 3 meters for boats to launch. Small batteries may be charged by umbilical chargers or during braking. It should be appreciated that small batteries may reference batteries that are small based on electric vehicle standards but, for example, may be larger than laptop batteries. It should also be appreciated that mechanical drum brakes or disc brakes may be utilized or required, but electric motors may provide even application control. Multi-trailer arrangements, such as a camper, all-terrain vehicle (ATV) flatbed, and a boat, may be provided in which multi-trailer stability control may be beneficial. It should be appreciated that axles may be independently controlled using a joystick and/or a tablet.

In other embodiments of the present disclosure, stages 1 and 2 may provide a smart trailer controller that may include a smart "head unit" and a smart "tail unit" in the trailer. Communication from the head unit to the tail unit may be provided over a standard 4- or 7-wire trailer connection in embodiments of the present disclosure. It should be appreciated that wireless and alternative configurations may be provided without departing from the present disclosure. Automatic detection of non-smart trailers or tow vehicles may be provided and may automatically fallback to a "dumb" mode. It should be appreciated that the smart trailer controller may support both high-speed (video speed) and low-speed (control speed) protocols including, but not limited to, automotive Ethernet, such as BroadR-Reach technology, and CAN, such as a 1-wire CAN and a 2-wire CAN, respectively. It should also be appreciated that a turn signal wire pair or other wires on the trailer connector may be replaced with 100 megabit (Mbit) BroadR-Reach or similar technology. It should further be appreciated that brake indicators may be overloaded with a 1-wire CAN and brake and backup indicators may be overloaded with a 2-wire CAN. Both head and tail units may support wired and wireless configuration (Bluetooth® in an embodiment of the present disclosure). The head unit may support "dummy" button inputs that may utilize blanks on the vehicle for a clean installation. It should be appreciated that vehicle dummy buttons may eliminate a need for a brake controller to be physically in view, which may provide additional space inside of vehicles. An aftermarket replacement to an OEM controller may be provided in some embodiments of the present disclosure. The tail unit may act as gateway for on-trailer network devices and additional trailers that may be behind. The tail unit may store trailer dynamics including, but not limited to, dimensions, weights, and other measurements, and may share the dynamics with the head unit for configuration of the smart trailer controller. A lock test mode may provide testing the trailer wheel braking force, tune system, and checking for failures. It should be appreciated that differential braking may be provided to provide skidding or increased maneuverability while backing up and at lower speeds. It should be appreciated that a wheel speed may be detected by conventional sensors or a tire pressure monitoring system (TPMS) accelerometer. It should be appreciated that an interface to ultrasonic proximity sensors for auto-braking may be provided. It should also be appreciated that sensors may be permanent or removable and may be mounted high or low in embodiments of the present disclosure. It should further be appreciated that a ball weight may be detected from a vehicle database and a gyro. It should be appreciated that a user may provide calibrations when the database is not available. It should also be appreciated that a trailer crawl control mode may progressively apply brakes to maintain speed down a steep hill, avoid locking, and notify a user of locking. It should be appreciated that stages 1 and 2 may provide power that may be automatically disconnected by head and/or tail units and may prevent the battery from draining the vehicle and/or trailer battery. It should be appreciated that the wireless battery health and status may be closely monitored. It should also be appreciated that the trailer security may be monitored, and if the trailer is not hooked onto an approved vehicle, the lead vehicle may be subject to user-specified actions or control. It should further be appreciated that trailer security may include locking brakes, flashing various lights, and sounding an alarm. It should be appreciated that manual tow hooks and a winch may be utilized if the unmanned vehicle and/or attached vehicles or units are trapped in poor terrain.

Further embodiments of the present disclosure may provide a smart trailer including self-powered axles, as shown and described herein.

Other embodiments of the present disclosure may provide a smart trailer controller, as shown and described herein.

The system and techniques as described and illustrated herein concerns a number of unique and inventive aspects. Some, but by no means all, of these unique aspects are summarized below.

Aspect 1 generally concerns a system that includes a control subsystem with a head unit on a head vehicle operatively coupled to a tail unit on a tail vehicle.

Aspect 2 generally concerns the system of aspect 1 in which the head unit communicates with the tail unit through a wired connection.

Aspect 3 generally concerns the system of aspect 2 in which the wired connection includes a standard 4-pin or 7-pin trailer plug connection with overlaying network functions. Recreational Vehicle (RV) and heavy duty trailer plugs include seven (7) wires and corresponding seven (7) pins. In one version, the 7-pin trailer plug is an RV trailer plug, and in another version, the 7-pin trailer plug includes a heavy duty trailer plug.

Aspect 4 generally concerns the system of aspect 1 in which the head unit communicates with the tail unit through a wireless connection.

Aspect 5 generally concerns the system of aspect 1 in which the head unit communicates with the tail unit through low and high speed communication networks.

Aspect 6 generally concerns the system of aspect 1 in which the control subsystem includes a low speed network for dynamics, braking, parking sensors, and load sensors.

Aspect 7 generally concerns the system of aspect 5 in which the control subsystem includes a high speed network for camera and radar communication.

Aspect 8 generally concerns the system of aspect 5 in which the head unit automatically detects non-smart tail controller and converts to standard braking operational mode.

Aspect 9 generally concerns the system of aspect 1 in which the head unit supports blank control button inputs to use as buttons for a visually clean vehicle install.

Aspect 10 generally concerns the system of aspect 1 in which the tail unit is configured to act as a gateway for other on-trailer devices and other tail units.

Aspect 11 generally concerns the system of aspect 1 in which the head unit is configured to receive trailer dynamics information from the tail unit.

Aspect 12 generally concerns the system of aspect 1 in which the control subsystem has a brake lock test mode for trailer brake force testing, system tuning, & failure testing.

Aspect 13 generally concerns the system of aspect 1 in which the tail unit includes a parking sensor array for auto-braking.

Aspect 14 generally concerns the system of aspect 1 in which the control subsystem determines trailer ball weight based on vehicle database and gyroscopic data.

Aspect 15 generally concerns the system of aspect 1 in which the tail unit has a trailer crawl mode for progressively applying brakes for speed control during steep descents.

Aspect 16 generally concerns the system of aspect 1 in which the tail unit has an automatic power disconnect mode to prevent battery drainage.

Aspect 17 generally concerns the system of aspect 1 in which the control subsystem is configured to alert a user when not properly hitched to the head vehicle.

Aspect 18 generally concerns the system of aspect 1 in which the tail unit is configured to detect when the head unit is a standard control unit.

Aspect 19 generally concerns the system of aspect 1 in which the tail unit includes a tail Inertial Measurement Unit (IMU).

Aspect 20 generally concerns the system of aspect 19 in which the tail IMU includes a nine axis gyroscope and accelerometer.

Aspect 21 generally concerns the system of aspect 19 in which the control subsystem is configured to measure pitch of the tail vehicle with the tail IMU.

Aspect 22 generally concerns the system of aspect 21 in which the control subsystem is configured to adjust braking of the tail vehicle based on the pitch.

Aspect 23 generally concerns the system of aspect 21 in which the subsystem is configured to use the pitch from the tail IMU to facilitate load leveling of the tail vehicle.

Aspect 24 generally concerns the system of aspect 21 in which the control subsystem is configured to determine tongue weight at least based on the pitch of the tail vehicle.

Aspect 25 generally concerns the system of aspect 21 in which the control subsystem is configured to calibrate brake lockup at least based on the pitch of the tail vehicle.

Aspect 26 generally concerns the system of aspect 19 in which the control subsystem is configured to perform sway control at least based on information from the tail IMU.

Aspect 27 generally concerns the system of aspect 1 in which the tail unit is configured to independently control brakes of the tail vehicle.

Aspect 28 generally concerns the system of aspect 27 in which the tail unit includes a wheel speed sensor associated with each wheel of the tail vehicle.

Aspect 29 generally concerns the system of aspect 28 in which the wheel speed sensor includes a Hall effect sensor.

Aspect 30 generally concerns the system of aspect 28 in which the wheel speed sensor includes a Tire Pressure Monitoring System (TPMS) sensor.

Aspect 31 generally concerns the system of aspect 28 in which the control subsystem is configured to calibrate brake force for each wheel based on wheel speed and brake current.

Aspect 32 generally concerns the system of aspect 27 in which the tail unit is configured to automatically apply the brakes in a crawl mode.

Aspect 33 generally concerns the system of aspect 32 in which the brakes are applied when a speed differential between the tow vehicle and the tail vehicle is exceeded.

Aspect 34 generally concerns the system of aspect 1 in which the tail unit includes a security key generator to authenticate the tail unit.

Aspect 35 generally concerns the system of aspect 34 in which the tail unit is configured to detect that the head unit is unauthorized.

Aspect 36 generally concerns the system of aspect 35 in which the tail unit is configured to provide an alert not before travelling a specified distance.

Aspect 37 generally concerns the system of aspect 36 in which the alert includes locking the brakes of the tail vehicle.

Aspect 38 generally concerns the system of aspect 36 in which the alert includes a specified light blinking pattern by the tail vehicle.

Aspect 39 generally concerns the system of aspect 1 in which the tail unit includes a wireless interface to allow a user to remotely apply brakes of the tail vehicle.

Aspect 40 generally concerns the system of aspect 1 in which the tail unit includes a tail connector to connect to other tail units.

Aspect 41 generally concerns the system of aspect 1 in which the tail unit is a trailer.

Aspect 42 generally concerns the system of aspect 1 in which the control subsystem includes a retractable lanyard to detect load shifts on the tail vehicle.

Aspect 43 generally concerns the system of aspect 1 in which the head unit includes a head Inertial Measurement Unit (IMU).

Aspect 44 generally concerns the system of aspect 43 in which the control subsystem is configured to provide a jackknife warning.

Aspect 45 generally concerns the system of aspect 43 in which the head unit is configured to estimate tongue weight based on a head vehicle pitch measurement from the head IMU.

Aspect 46 generally concerns the system of any previous aspect in which the head unit communicates with the tail unit through a wired connection.

Aspect 47 generally concerns the system of any previous aspect in which the wired connection includes a standard 4-pin or 7-pin trailer plug connection with overlaying network functions.

Aspect 48 generally concerns the system of any previous aspect in which the head unit communicates with the tail unit through a wireless connection.

Aspect 49 generally concerns the system of any previous aspect in which the head unit communicates with the tail unit through low and high speed communication networks.

Aspect 50 generally concerns the system of any previous aspect in which the control subsystem includes a low speed network for dynamics, braking, parking sensors, and load sensors.

Aspect 51 generally concerns the system of any previous aspect in which the control subsystem includes a high speed network for camera and radar communication.

Aspect 52 generally concerns the system of any previous aspect in which the head unit automatically detects non-smart tail controller and converts to standard braking operational mode.

Aspect 53 generally concerns the system of any previous aspect in which the head unit supports blank control button inputs to use as buttons for a visually clean vehicle install.

Aspect 54 generally concerns the system of any previous aspect in which the tail unit is configured to act as a gateway for other on-trailer devices and other tail units.

Aspect 55 generally concerns the system of any previous aspect in which the head unit is configured to receive trailer dynamics information from the tail unit.

Aspect 56 generally concerns the system of any previous aspect in which the control subsystem has a brake lock test mode for trailer brake force testing, system tuning, & failure testing.

Aspect 57 generally concerns the system of any previous aspect in which the tail unit includes a parking sensor array for auto-braking.

Aspect 58 generally concerns the system of any previous aspect in which the control subsystem determines trailer ball weight based on vehicle database and gyroscopic data.

Aspect 59 generally concerns the system of any previous aspect in which the tail unit has a trailer crawl mode for progressively applying brakes for speed control during steep descents.

Aspect 60 generally concerns the system of any previous aspect in which the tail unit has automatic power disconnect mode to prevent battery drainage.

Aspect 61 generally concerns the system of any previous aspect in which the control subsystem is configured to alert a user when not properly hitched to the head vehicle.

Aspect 62 generally concerns the system of any previous aspect in which the tail unit is configured to detect when the head unit is a standard control unit.

Aspect 63 generally concerns the system of any previous aspect in which the tail unit includes a tail Inertial Measurement Unit (IMU).

Aspect 64 generally concerns the system of any previous aspect in which the tail IMU includes a nine axes gyroscope and accelerometer.

Aspect 65 generally concerns the system of any previous aspect in which the control subsystem is configured to measure pitch of the tail vehicle with the tail IMU.

Aspect 66 generally concerns the system of any previous aspect in which the control subsystem is configured to adjust braking of the tail vehicle based on the pitch.

Aspect 67 generally concerns the system of any previous aspect in which the subsystem is configured to use the pitch from the tail IMU to facilitate load leveling of the tail vehicle.

Aspect 68 generally concerns the system of any previous aspect in which the control subsystem is configured to determine tongue weight at least based on the pitch of the tail vehicle.

Aspect 69 generally concerns the system of any previous aspect in which the control subsystem is configured calibrate brake lockup at least based on the pitch of the tail vehicle.

Aspect 70 generally concerns the system of any previous aspect in which the control subsystem is configured to perform sway control at least based on information from the tail IMU.

Aspect 71 generally concerns the system of any previous aspect in which the tail unit is configured to independently control brakes of the tail vehicle.

Aspect 72 generally concerns the system of any previous aspect in which the tail unit includes wheel speed sensor associated with each wheel of the tail vehicle.

Aspect 73 generally concerns the system of any previous aspect in which the wheel speed sensor includes a Hall effect sensor.

Aspect 74 generally concerns the system of any previous aspect in which the wheel speed sensor includes a Tire Pressure Monitoring System (TPMS) sensor.

Aspect 75 generally concerns the system of any previous aspect in which the control subsystem is configured to calibrate brake force for each wheel based on wheel speed and brake current.

Aspect 76 generally concerns the system of any previous aspect in which the tail unit is configured to automatically apply the brakes in a crawl mode.

Aspect 77 generally concerns the system of any previous aspect in which the brakes are applied when a speed differential between the tow vehicle and the tail vehicle is exceeded.

Aspect 78 generally concerns the system of any previous aspect in which the tail unit includes a security key generator to authenticate the tail unit.

Aspect 79 generally concerns the system of any previous aspect in which the tail unit is configured to detect that the head unit is unauthorized.

Aspect 80 generally concerns the system of any previous aspect in which the tail unit is configured to provide an alert not before travelling a specified distance.

Aspect 81 generally concerns the system of any previous aspect in which the alert includes locking brakes of the tail vehicle.

Aspect 82 generally concerns the system of any previous aspect in which the alert includes a specified light blinking pattern by the tail vehicle.

Aspect 83 generally concerns the system of any previous aspect in which the tail unit includes a wireless interface to allow a user to remotely apply brakes of the tail vehicle.

Aspect 84 generally concerns the system of any previous aspect in which the tail unit includes a tail connector to connect to other tails units.

Aspect 85 generally concerns the system of any previous aspect in which the tail unit is a trailer.

Aspect 86 generally concerns the system of any previous aspect in which the control subsystem includes a retractable lanyard to detect load shifts on the tail vehicle.

Aspect 87 generally concerns the system of any previous aspect in which the head unit includes a head Inertial Measurement Unit (IMU).

Aspect 88 generally concerns the system of any previous aspect in which the control subsystem is configured to provide a jackknife warning.

Aspect 89 generally concerns the system of any previous aspect in which the head unit is configured to estimate tongue weight based on a head vehicle pitch measurement from the head IMU.

Aspect 90 generally concerns a method of operating the system of any previous aspect.

Further forms, objects, features, aspects, benefits, advantages, and embodiments of the present invention will become apparent from a detailed description and drawings provided herewith.

BRIEF DESCRIPTION OF THE DRAWINGS

FIG. 18 is a diagrammatic view of a lanyard that can be used in the FIG. 1 vehicle system.

DESCRIPTION OF THE SELECTED EMBODIMENTS

Figure 1:
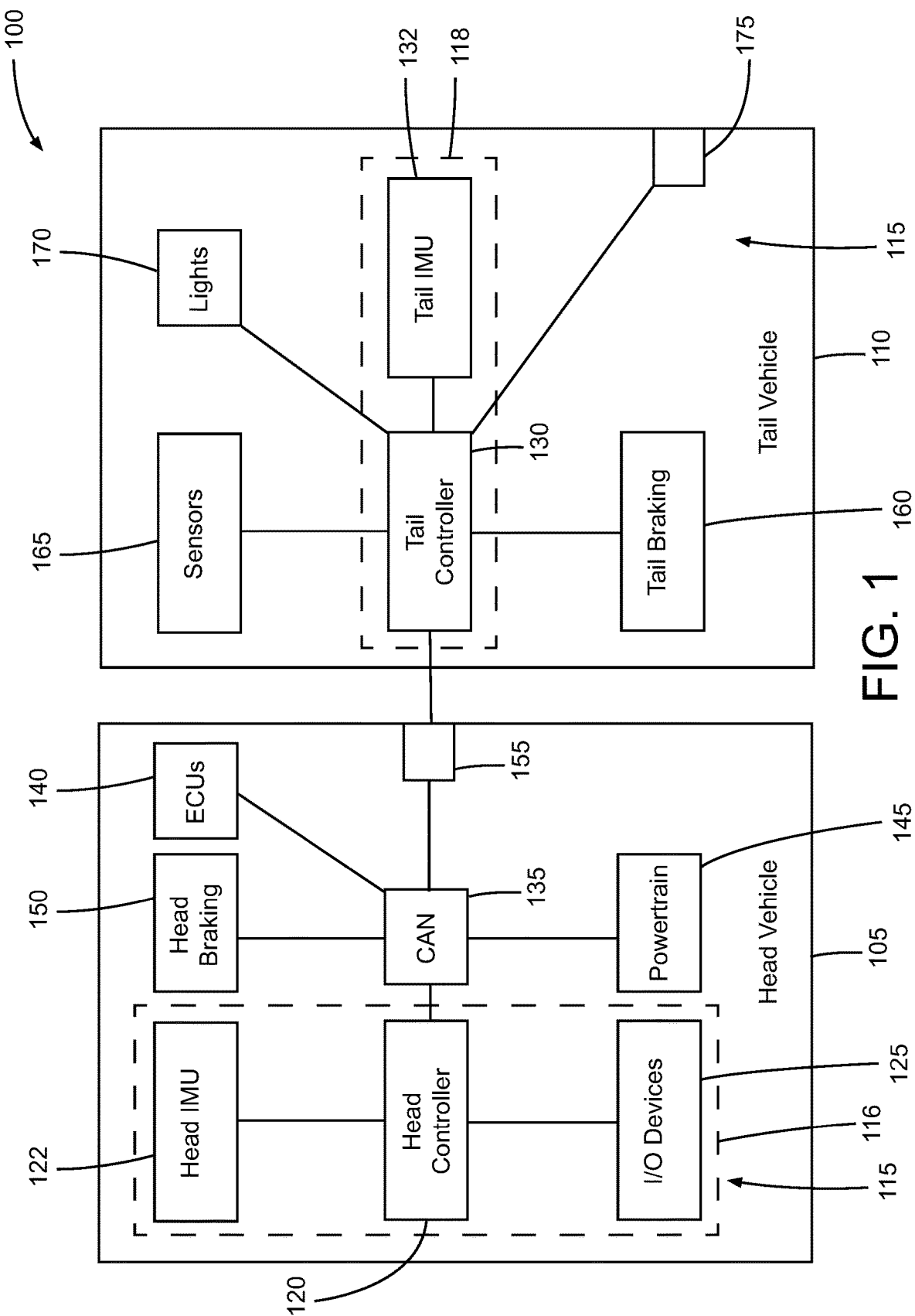
FIG. 1 is a diagrammatic view of a vehicle system.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

The reference numerals in the following description have been organized to aid the reader in quickly identifying the drawings where various components are first shown. In particular, the drawing in which an element first appears is typically indicated by the left-most digit(s) in the corresponding reference number. For example, an element identified by a "100" series reference numeral will likely first appear in FIG. 1, an element identified by a "200" series reference numeral will likely first appear in FIG. 2, and so on.

A vehicle system 100 according to one example is illustrated in FIG. 1. As shown, the vehicle system 100 includes a tow or head vehicle 105 and a tail vehicle 110. The head vehicle 105 can for example include self-powered vehicles such as a car or truck. The head vehicle 105 can for instance include internal combustion, hybrid, or electric type vehicles. Normally, the head vehicle 105 is driven by a driver, but in other examples, the head vehicle 105 can be an autonomous or semi-autonomous type vehicle. The head vehicle 105 is configured to physically tow the tail vehicle 110. The tail vehicle 110 can include towed vehicles like trailers such as for moving cargo, acting as a mobile dwelling (e.g., mobile home or camper), and the like. The tail vehicle 110 is normally unpowered and unable to move without the assistance of the head vehicle 105, but the tail vehicle 110 in some cases can incorporate portable power sources such as generators, heaters, and the like such as for powering auxiliary equipment. In other cases, the vehicle system 100 can be modified to have self-powered vehicles acting as the tail vehicle 110 such as when in an unpowered state. For example, the vehicle system 100 can be used for towing other disabled and/or spare vehicles.

As can be seen in FIG. 1, the vehicle system 100 includes a control subsystem 115 that is configured to control the braking and other functions of the tail vehicle 110. In the illustrated example, the control subsystem 115 includes a head unit 116 mounted in the head vehicle 105 and a tail unit 118 mounted on the tail vehicle 110. The control subsystem 115 in most cases is constructed to be installed as aftermarket product in which the head unit 116 is retrofitted to the head vehicle 105 and the head unit 116 is mounted to the tail vehicle 110. In some cases, some or all of the control subsystem 115 can be incorporated into the originally manufactured head vehicle 105 and/or tail vehicle 110 by the Original Equipment Manufacturer ("OEM"). In such a situation, the control subsystem 115 can be sold as an upsell item.

The head unit 116 has a head controller 120, a head Inertial Measurement Unit ("IMU") 122 operatively coupled to the head controller 120, and one or more Input/Output Devices ("I/O Devices") 125 operatively coupled to the head controller 120. As will be explained in greater detail below, the head controller 120 generally controls the overall function of the control subsystem 115, and more particularly, the head controller 120 controls a number of operations and functions of the tail vehicle 110, such as braking, through the tail unit 118. Among other things, the head IMU 122 measures the orientation and acceleration of the head vehicle 105 and provides this information to the head controller 120. The head IMU 122 can for example include one or more accelerometers and gyroscopes, but the head IMU 122 can include other features such as a Global Positioning System (GPS). In one example, the head IMU 122 is able to measure orientation and acceleration of the head vehicle 105 along nine (9) axes, but in other examples, the head IMU 122 can monitor along more or less axes. In the illustrated example, the head IMU 122 is depicted as being directly connected to the head controller 120, but the head IMU 122 can be indirectly connected to the head controller 120 in other examples. For instance, the head IMU 122 in other variations can be an IMU that is originally installed by the OEM, and the head controller 120 communicates with the head IMU 122 though the original or standard networks of the head vehicle 105. The I/O devices 125 allow the driver or other individual to interact with the control subsystem 115, such as through buttons, screens, lights, and/or audible alerts, to for example monitor and control the functions of the control subsystem 115. In one example, all of the I/O devices 125 are retrofitted to the head vehicle 105, but in other examples, some or all of he I/O devices 125 can be part of the I/O devices originally installed in the head vehicle 105 by the OEM.

With continued reference to FIG. 1, the tail unit 118 in the tail vehicle 110 includes a tail controller 130 and a tail IMU 132. As will be depicted in subsequent drawings, the tail unit 118 can further include other devices such as I/O devices. The tail controller 130 controls the overall function of the tail vehicle 110 such as braking and lighting. The tail controller 130 can also act as a gateway for other tail units 118 in other tail vehicles 110 that are coupled to the tail vehicle 110. Similar to the head IMU 122, the tail IMU 132 measures the orientation and acceleration of the tail vehicle 110 and provides this information to the tail controller 130. The tail IMU 132 can for example include one or more accelerometers and gyroscopes, but the tail IMU 132 can include other features such as a GPS. In one example, the tail IMU 132 is able to measure orientation and acceleration of the tail vehicle 110 along nine (9) axes, but in other examples, the tail IMU 132 can monitor along more or less axes. In the illustrated example, the tail IMU 132 is depicted as being directly connected to the tail controller 130, but the tail IMU 132 can be indirectly connected to the tail controller 130 in other examples.

As shown, the head unit 116 is operatively connected to at least one controller area network ("CAN") 135 of the head vehicle 105. As should be recognized that head vehicle 105 can include more than one controller area network ("CAN") 135 such as low and high speed CANs. The head vehicle 105 further includes one or more ECUs 140 that are operatively connected to the CAN 135. As should be appreciated, the ECUs 140 are used to control and monitor the various functions of the head vehicle 105. For instance, as shown in FIG. 1, the ECUs 140 can be incorporated into a powertrain system 145 of the head vehicle 105, such as in an Engine Control Module (ECM) and/or Transmission Control Module (TCM) of the powertrain system 145, and into a head braking system 150 of the head vehicle 105 like in an Electronic Braking System (EBS). It should be recognized that the powertrain system 145 for instance includes an engine or other motors along with a drive train that is used to supply power that among other things moves the head vehicle 105, and the head braking system 150 includes brakes as well as other equipment that is used to slow down, stop, and/or hold stationary the head vehicle 105. In the depicted example, the powertrain system 145 and head braking system 150 as well as the ECUs 140 in other systems are able to communicate with the head controller 120 of the head unit 116 through the CAN 135.

A head connector 155 of the head vehicle 105 is also operatively connected to the head unit 116 through the CAN 135. The head connector 155 provides a communication link between the head unit 116 and the tail unit 118 of the control subsystem 115. In one form, the head connector 155 includes a four (4) pin type standard trailer connector, and in another form, the head connector 155 includes a seven (7) pin type standard trailer connector. Other examples of the head connector 155 can have different pin configurations or numbers of pins, and the head vehicle 105 in other examples can include more than one head connector 155.

In the illustrated example, the tail controller 130 of the tail unit 118 in the tail vehicle 110 is operatively connected to the head controller 120 of the head unit 116 via the head connector 155 and CAN 135. The tail controller 130 in the tail unit 118 is further operatively coupled to a tail braking system 160, one or more sensors 165, and one or more lights 170 of the tail vehicle 110. The tail braking system 160 includes brakes as well as other equipment that is used to slow down, stop, and/or hold stationary the tail vehicle 110. As will be expanded upon below, the sensors 165 are used to sense various conditions of the tail vehicle 110 like wheel speed and parking conditions. Through the sensors 165 the tail controller 130 among other things is able to determine whether the tail vehicle 110 is properly braking and/or whether there is a potential collision issue during parking. The lights 170 include lights that are used to light the tail vehicle 110 like taillights and sidelights. The tail unit 118 in some examples through the sensors 165 and lights 170 are able to provide an alert when a theft or unauthorized use of the tail vehicle 110 has occurred.

The tail vehicle 110 further includes a tail connector 175 that is operatively connected to a tail controller 130 of the tail unit 118. In one form, the tail connector 175 includes a four (4) pin type standard trailer connector, and in another form, the tail connector 175 includes a seven (7) pin type standard trailer connector. Other examples of the tail connector 175 can have different pin configurations or numbers of pins, and the tail vehicle 110 in other examples can include more than one tail connector 175. Through the tail connector 175, the control subsystem 115 is able to control multiple tail vehicles 110 that are strung together in a train configuration. In such a case, the tail controller 130 can act as a gateway for transmitting information and instructions between the head controller 120 and other tail units 118 that are directly or indirectly pulled by the tail vehicle 110.

It should be recognized that the components of the vehicle system 100 can be operatively coupled to one another in ways different than is illustrated in FIG. 1. For instance, the head IMU 122 and I/O devices 125 in other variations are operatively connected to the head controller 120 through the CAN 135. As another example, the components of the tail vehicle 110 can be operatively connected together through one or more CANs in the tail vehicle 110.

Figure 2:
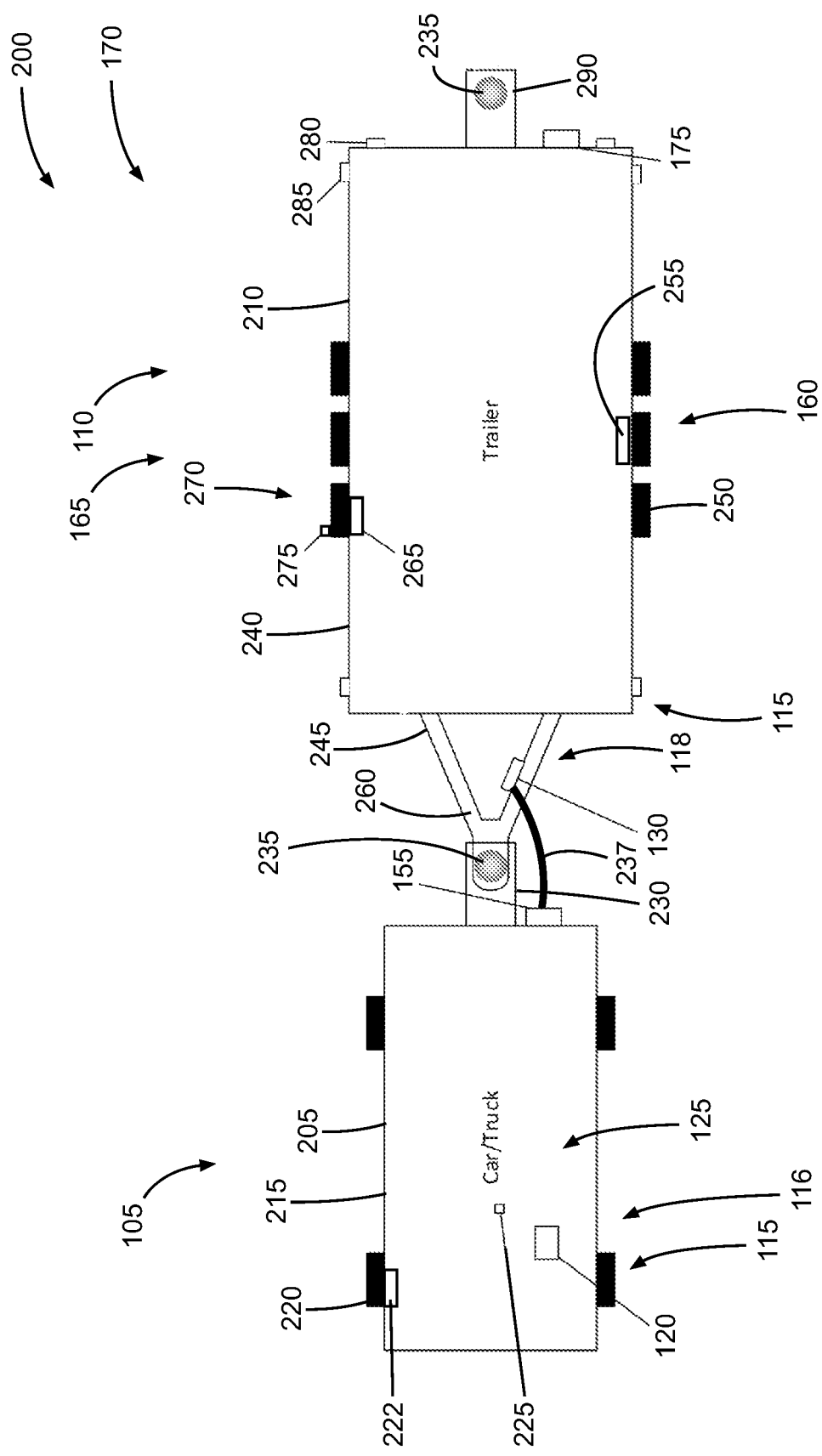
FIG. 2 is a diagrammatic view of an automobile-trailer system that incorporates the FIG. 1 vehicle system.

One particular installation example of the vehicle system 100 is depicted by an automobile-trailer system 200 shown in FIG. 2. In this example, the head vehicle 105 corresponds the an automobile 205 and the tail vehicle 110 corresponds to a trailer 210. The automobile 205 for example can include a truck or a car, and the trailer 210 can include a trailer for hauling cargo. Similar to before, the automobile-trailer system 200 includes the control subsystem 115 with the head unit 116 mounted inside the automobile 205 and the tail unit 118 mounted to the trailer 210. The automobile 205 includes a chassis 215, one or more wheels 220, and one or more brakes 222 for the wheels 220. The brakes 222 form a part of the head braking system 150 (FIG. 1) in the automobile 205. The head controller 120 of the head unit 116 is mounted to the chassis 215 of the automobile 205. Note for the sake of clarity, most of the various wired or network connections already illustrated in FIG. 1 are not shown in FIG. 2. The components of the automobile-trailer system 200 in FIG. 2 are wired or operatively connected in the same fashion as shown in FIG. 1.

In one example, at least part of the I/O devices 125 are mounted in the cabin of the automobile 205 so that the I/O devices 125 are accessible and/or visible to the driver and/or other occupants inside the cabin. In the illustrated example, the I/O devices 125 includes a console blank button interface 225 so as to create a clean appearance on the console inside the cabin. When certain features or accessories are not available in particular vehicle models, vehicle OEMs will install blank panel button covers, which are sometimes referred to as "dummy buttons", in the console where buttons (or other I/O devices) for the particular button for activating the now inoperable or deactivated function in the particular model can be mounted. As will be described below, the control subsystem 115 utilizes these blank panel button cover areas for the I/O devices 125 so as to provide a cleaner looking interface.

At the rear, the automobile 205 further includes the head connector 155 and a head tow hitch 230 used to physically tow the automobile 205. In the illustrated example, the head tow hitch 230 includes a tow ball 235, but other types of mechanical connections can be used in other examples. As shown, a wiring harness cable 237 operatively connects the head connector 155 of the automobile 205 to the tail controller 130 of the tail unit 118 on the trailer 210. In some forms, the wiring harness cable 237 includes a four (4) or seven (7) pin type cable, but other types of cables can be used in other variations.

As shown in FIG. 2, the trailer 210 includes a trailer body 240 that is mounted to a trailer frame 245. The tail controller 130 of the tail unit 118 is likewise mounted to the trailer frame 245. The trailer 210 further includes one or more trailer wheels 250 and one or more brakes 255 that form part of the tail braking system 160. Proximal to the automobile 205, the trailer frame 245 has a tow coupler 260 that is configured to couple and secure the trailer 210 to the automobile 205.

The sensors 165 in the trailer 210 include one or more wheel speed sensors 265 and a Tire-Pressure Monitoring System ("TPMS") 270 with one or more TPMS sensors 275. As will be explained in further detail below, the wheel speed sensors 265 and/or TPMS sensors 275 can be used together or separately to monitor the speed of the trailer wheels 250 which can be used for stability or anti-sway control with the brakes 255 such as during braking. The lights 170 on the trailer 210 in FIG. 2 include one or more taillights 280 and one or more side marker lights 285. The taillights 280 and/or side marker lights 285 can be activated by the control subsystem 115 to emit special light or blinking patterns (e.g., Morse code signals) on a number of occasions such as when theft or unauthorized use of the automobile 205 and/or trailer 210 occurs. The brakes 255 of the tail braking system 160 can also be locked by the control subsystem 115 on some occasions to prevent or minimize the risk of theft or unauthorized use of the automobile 205 and/or trailer 210.

At the rear, the trailer 210 includes the tail connector 175 and a tail tow hitch 290 for towing additional trailers 210. In the illustrated example, the tail tow hitch 290 includes the tow ball 235, but other types of tow hitch connectors can be used in other examples. As noted before, the tail connector 175 allows the head controller 120 and/or tail controller 130 to communicate with the additional trailers 210. In one form, the tail controller 130 acts as a gateway between the head controller 120 and the second (or more) trailer 210 being towed by the automobile 205. The additional trailers 210 can be connected through additional or supplemental wiring harness cables 237.

Figure 3:
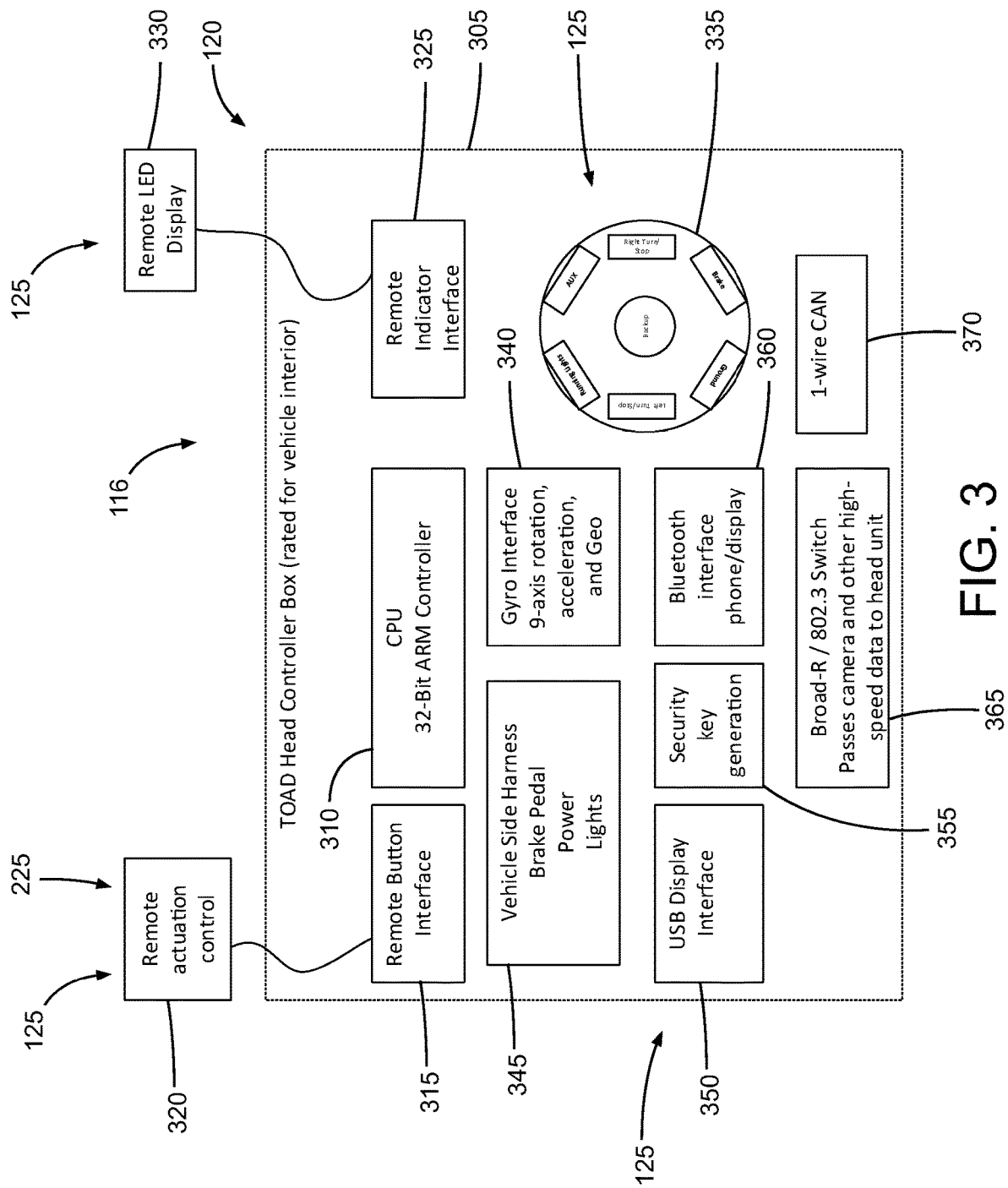
FIG. 3 is a diagrammatic view of a head controller in the FIG. 2 automobile-trailer system.

One example of the head controller 120 is illustrated in FIG. 3. As shown, the head controller 120 includes a housing 305 in which a processor 310 and most of the other components of the are mounted. The housing 305 along with the rest of the head controller 120 in one form is rated for installation into the interior of vehicles such as in the vehicle cabin, but all or part of the head controller 120 can be installed elsewhere on the head vehicle 105. The processor 310 has software and/or firmware that generally controls the overall function of the head controller 120. In the illustrated example, the processor 310 includes a 32-bit Advanced RISC Machines (ARM) processor but other types can be used. The processor 310 in the depicted example is operatively connected, either directly or indirectly, to the other components show in FIG. 3. Generally, the processor 310 processes information from and provides instructions to the various components in FIG. 3.

In the illustrated example, at least some of the I/O devices 125 are located outside of the housing 305, but in other variations all of the I/O devices 125 can be self-contained inside the housing 305 of the head controller 120. In the illustrated example, the I/O devices 125 include a remote button interface 315 located inside the housing 305 that is operatively connected to at least one remote actuation control 320 located outside of the housing 305. The remote actuation control 320 through the remote button interface 315 is able provide input from the driver or other user. For instance, the remote actuation control 320 can include one or more buttons for activating or deactivating various functions. In one form, the remote actuation control 320 forms at least part of the console blank button interface 225. The I/O devices 125 further include a remote indicator interface 325 mounted insides the housing 305 and a remote display 330 located outside of the housing 305 that is operatively connected to the remote display 330. Through the remote indicator interface 325 and remote display 330, the processor 310 is able to display or otherwise provide information to the user like operational conditions, speed, and/or warning signals. The I/O devices 125 can further include at least one local I/O device 335 that is housed by the housing 305. In one variation, the local I/O device 335 includes one or more indicator lights (e.g., LEDs) that indicate various conditions such as brake, backup, and/or other warnings conditions, or indications. Alternatively or additionally, the local I/O device 335 can act as an input device. For instance, the local I/O device 335 can include a toggle type control button.

The head controller 120 further includes an IMU interface 340 that facilitates communication between the processor 310 and the head IMU 122 (FIG. 1). Inside the housing 305, the head controller 120 further has a vehicle side harness interface 345. In one form, the vehicle side harness interface 345 allows the processor 310 to communicate with and/or receive power from the head braking system 150, power system, and/or lights of the automobile 205. In one variation, a separate side harness is used to form the communication link, but in other variations, the CAN 135 is used to facilitate communication. The I/O devices 125 in FIG. 3 further include a USB display interface 350 form communicating with and displaying information on a Universal Serial Bus (USB) type display. To reduce the risk of theft or other unauthorized uses, the head controller 120 further includes a security key generator 355 that generates a security key for the processor 310 to authenticate and pair the head unit 116 with the tail unit 118. The I/O devices 125 further includes a wireless interface 360 that allows the head unit 116 to interact wirelessly with other devices. For instance, the processor 310 through the wireless interface 360 is able to establish a wireless connection (e.g., a Bluetooth® type connection) with a mobile device such as a mobile phone. Through the mobile phone, an individual for example is able to monitor the status of the vehicle system 100, control various functions, and otherwise interact with the control subsystem 115.

The processor 310 of the head controller 120 is uniquely configured to communicate over both high and low speed CANs. To facilitate this, the head controller 120 in FIG. 3 includes a high speed network interface 365 and a low speed network interface 370. The high speed network interface 365 allows the head unit 116 to receive and process camera or other high speed data, and the low speed network interface 370 allows the processor 310 of the head unit 116 to receive and process low speed data. In one form, the high speed network interface 365 includes a Broad-R/802.3 type switch, and the low speed network interface 370 includes a 1-wire CAN type interface. The high speed network interface 365 and/or low speed network interface 370 can include other types of interfaces in other examples. The high speed network interface 365 and low speed network interface 370 are connected to two separate controller area networks 135 (i.e., one high speed and the other low speed), but in other variations, the high speed network interface 365 and low speed network interface 370 can be connected to the same CAN 135.

Figure 4:
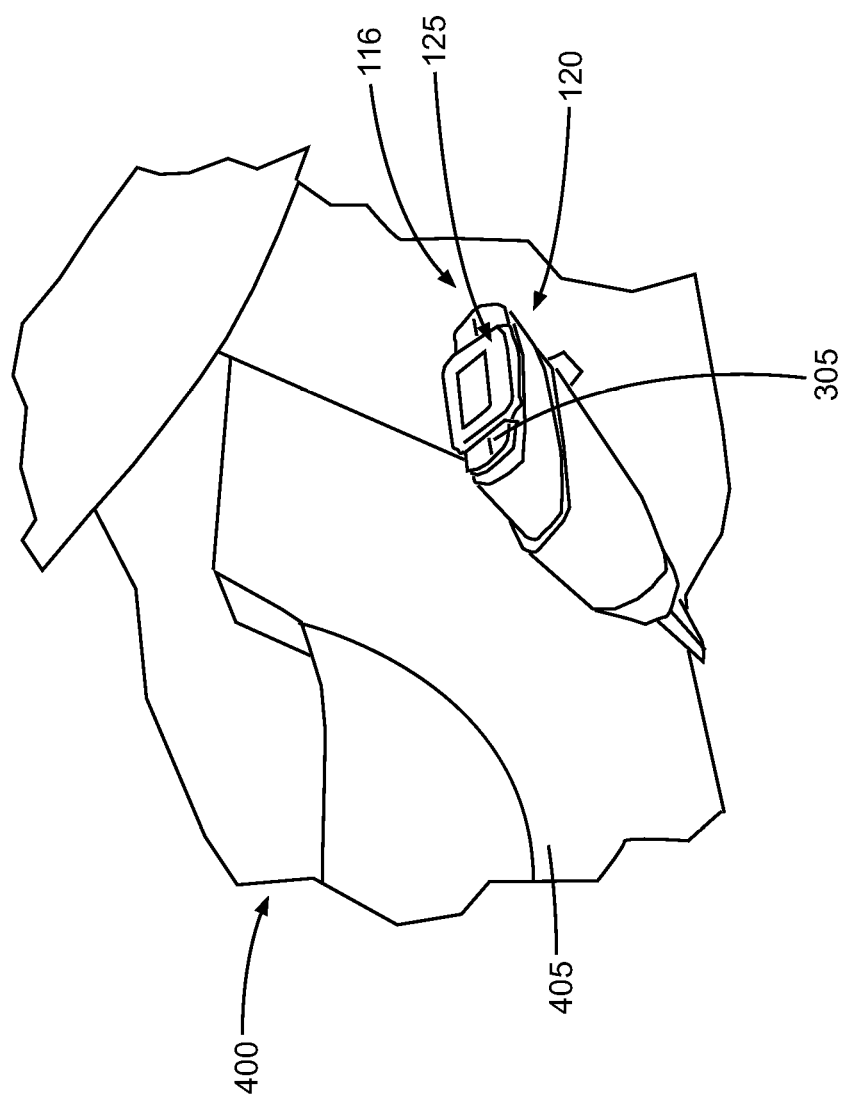
FIG. 4 is an enlarged perspective view of the FIG. 3 head controller installed in a vehicle.

As alluded to before, while the control subsystem 115 can be incorporated into the vehicle system 100 when initially manufactured by the OEM, the control subsystem 115 has a number of features that make the control subsystem 115 well-suited for being sold and retrofitted as an aftermarket product. FIG. 4 for example shows a cabin interior 400 of the automobile 205 with a vehicle console 405. In this illustrated example, the housing 305 of the head controller 120 is mounted to the vehicle console 405 near the driver side of the cabin interior 400. The driver is able to interact with the control subsystem 115 through the I/O devices 125 such as through buttons and a display.

Figure 5:
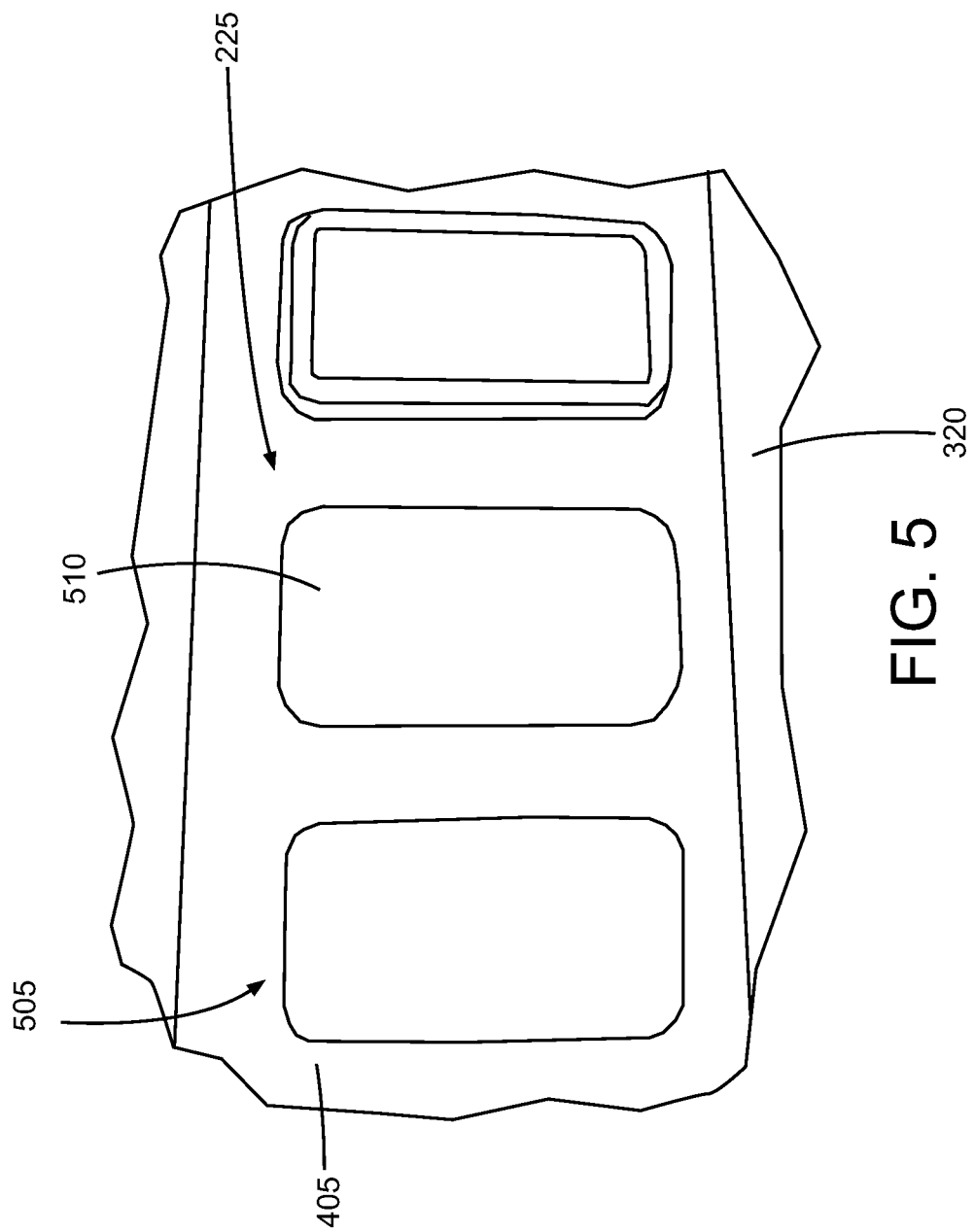
FIG. 5 is an enlarged perspective view of a console blank button interface in the FIG. 3 head controller.

Turning to FIG. 5, as was mentioned before, at least part of the I/O devices 125 can mounted in the vehicle console 405 of the automobile 205 so that the I/O devices 125 are accessible and/or visible to the driver and/or other occupants inside the cabin. As shown, the console blank button interface 225 is located in the vehicle console 405 by one or more console buttons 505. The illustrated console blank button interface 225 creates a clean appearance on the vehicle console 405 inside the cabin interior 400. When certain features or accessories are not available in particular vehicle models, vehicle OEMs will install blank panel button covers, which are sometimes referred to as "dummy buttons", in the console where buttons (or other I/O devices) for the particular button for activating the now inoperable or deactivated function in the particular model are located. The control subsystem 115 includes a blank console button 510 located at these blank panel button cover areas for the I/O devices 125 so as to provide a cleaner looking interface. The blank console button 510 acts as one of the remote actuation controls 320 for controlling the operation of the control subsystem 115. For instance, the blank console button 510 can be pressed to turn on a particular braking function of the control subsystem 115.

Figure 6:
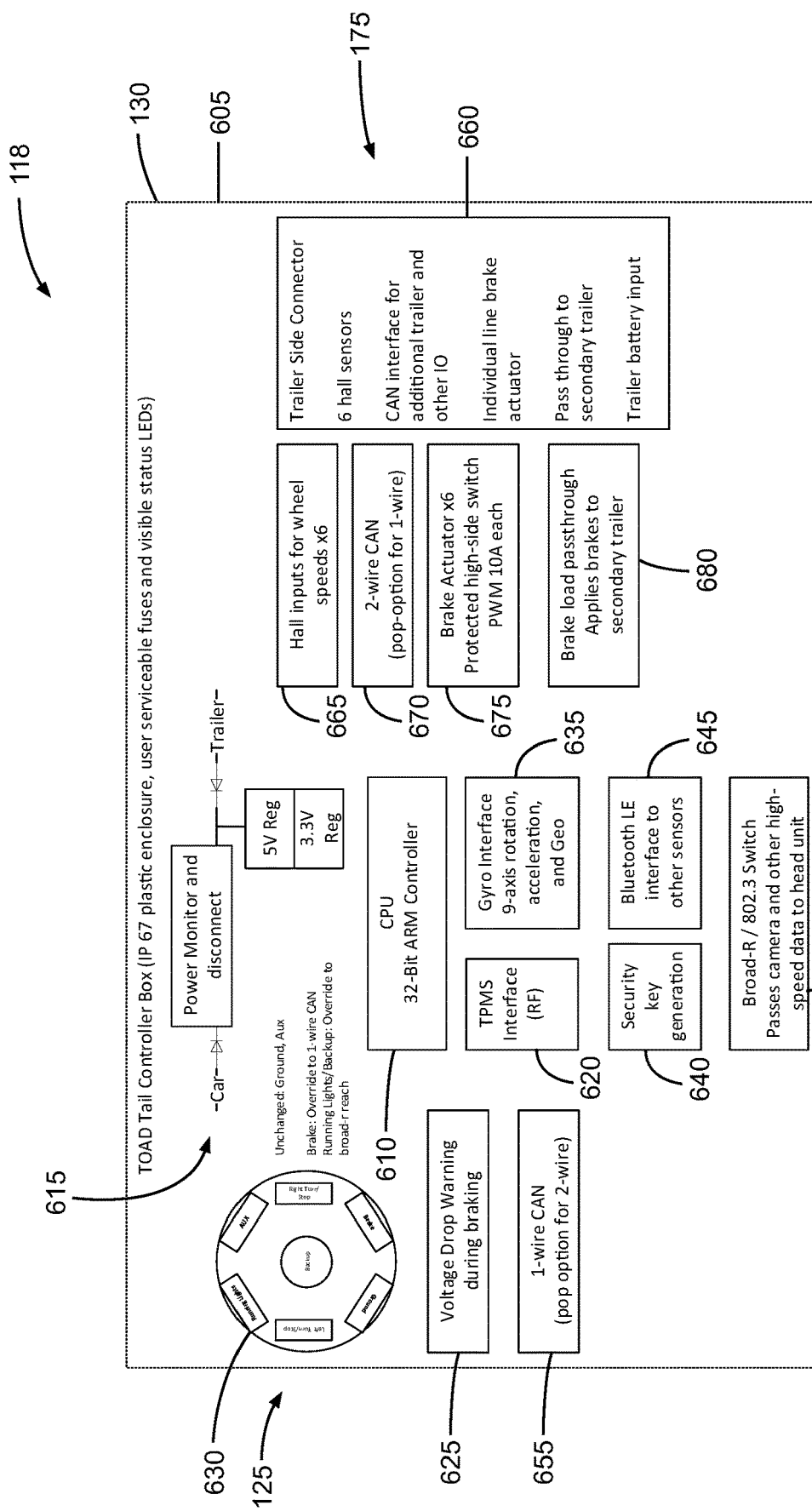
FIG. 6 is a diagrammatic view of a tail unit in the FIG. 2 automobile-trailer system.

One example of the tail controller 130 is illustrated in FIG. 6. As shown, the tail controller 130 includes a tail controller housing 605 in which a processor 610 and most of the other components of the tail controller 130 are mounted. The tail controller housing 605 along with the rest of the tail controller 130 in one form is installed on the trailer frame 245, but all or part of the tail controller 130 can be installed elsewhere on the tail vehicle 110. The processor 610 has software and/or firmware that generally controls the overall function of the tail controller 130. In the illustrated example, the processor 610 includes a 32-bit Advanced RISC Machines (ARM) processor but other types can be used. The processor 610 in the depicted example is operatively connected, either directly or indirectly, to the other components show in FIG. 6. Generally, the processor 610 processes information from and provides instructions to the various components in FIG. 6.

In camping trailers as well as in other applications, it is common to run a battery of the trailer 210 low after a few days of camping with loads like lights, cell phone chargers, televisions, and the like. If the trailer 210 is plugged in to the automobile 205 for this whole time, the trailer 210 will also drain the battery of the automobile 205 thereby preventing starting of the automobile 205. On the other hand, it is desirable to leave the automobile 205 plugged in for some amount of time every day to recharge the batteries of the trailer 210. The tail controller 130 includes a unique power disconnect monitor 615 that addresses these as well as other issues. With the power disconnect monitor 615 integrated into the tail controller 130, both disconnect monitoring and communication are packaged in the same place (i.e., the tail controller housing 605).

The power disconnect monitor 615 is able to monitor the voltage of both the head vehicle 105 and the tail vehicle 110 as well as the current draw. The power disconnect monitor 615 occasionally opens a switch between the automobile 205 and trailer 210 to monitor the state of charge of the batteries. The power disconnect monitor 615 includes a current sensor and controller to monitor the amount of current being pulled and the status of the battery. The processor 610 is then able to report this to the user and/or to the head unit 116. The power disconnect monitor 615 is configured to determine when the battery of the automobile 205 is drawn down to a certain percentage charge (e.g., 80%) and then disconnect the battery of the automobile 205. The power disconnect monitor 615 is also able to adapt for the type of battery being used. For example, the power disconnect monitor 615 is configured to monitor standard models of lead acid batteries and alternate battery types like Absorbed Glass Mat (AGM) type batteries. When a switch in battery type occurs, the user through the I/O device 125 indicates the change, and the head unit 116 or tail unit 118 uses a lookup table to select a difference in the voltage vs. charge static and the state of charge tracking model.

The tail controller 130 of the tail unit 118 further includes a TPMS interface 620 that is configured to wirelessly communicate with the TPMS sensors 275. As noted before, the processor 610 through the TPMS sensors 275 are able to adjust the speed of the individual trailer wheels 250 so as to facilitate better braking. Another potentially dangerous issue during braking is losing power to the brakes 255. The tail controller 130 of the tail unit 118 further includes a voltage drop warning system 625 that monitors for voltages drops in the tail braking system 160 during braking.

As noted before, the tail controller 130 can further include various I/O devices. In FIG. 6, the tail controller 130 further includes at least one local I/O device 630 that is housed by the tail controller housing 605. In one variation, the local I/O device 630 includes one or more indicator lights (e.g., LEDs) that indicate various conditions such as brake, backup, and/or other warnings conditions or indications. Alternatively or additionally, the local I/O device 630 can acts as an input device. For instance, the local I/O device 630 can include a toggle type control button.

The tail controller 130 further includes an IMU interface 635 that facilitates communication between the processor 610 and the tail IMU 132 (FIG. 1). To reduce the risk of theft or other unauthorized uses, the tail controller 130 further includes a security key generator 640 that generates a security key for the processor 610 to authenticate and pair the tail unit 118 with the head unit 116. In other words, the security keys are exchanged between the key generated by the security key generator 355 in the head controller 120 and the key generated by the security key generator 640 in the tail controller 130. The tail controller 130 further includes a wireless interface 645 that allows the head unit 116 to interact wirelessly with other devices such as the sensors 165. For instance, the processor 610 through the wireless interface 645 is able to establish a wireless connection (e.g., a Bluetooth® Low Energy (LE) type connection) with various sensors 165 (e.g., the wheel speed sensors 265, etc.).

The processor 610 of the tail controller 130 is uniquely configured to communicate over both high and low speed CANs. To facilitate this, the tail controller 130 in FIG. 6 includes a high speed network interface 650 and a low speed network interface 655. The high speed network interface 650 allows the head unit 116 to receive and process camera or other high speed data between the head unit 116 and tail unit 118. The low speed network interface 655 allows the processor 610 of the tail unit 118 to receive and process low speed data between the head unit 116 and tail unit 118. In one form, the high speed network interface 650 includes a Broad-R/802.3 type switch and the low speed network interface 655 includes a 1-wire CAN type interface. In another variation, the low speed network interface 655 can include a 2-wire CAN connection. The high speed network interface 650 and/or low speed network interface 655 can include other types of interfaces in other examples. The high speed network interface 650 and high speed network interface 650 are connected to two separate CANs (i.e., one high speed and the other low speed), but in other variations, the high speed network interface 650 and low speed network interface 655 can be connected to the same CAN and/or harness.

As depicted in FIG. 6, the tail unit 118 further includes a tail connector interface 660 for communicating with other components inside the trailer 210 or towed by the trailer 210. For instance, the tail connector interface 660 provides the physical connection of the processor 610 with the brakes 255, wheel speed sensors 265, additional towed trailers 210 connected through tail connector 175, other I/O devices, and/or the battery in the trailer. In particular, the tail controller 130 includes a wheel speed sensor interface 665 configured to communicate with the wheel speed sensors 265 through the tail connector interface 660. A supplemental CAN interface 670 forms a connection with one or more other trailers towed by the trailer 210 so that the status of the towed trailers can be monitored and passed through the head controller 120 or to I/O devices. As depicted, the tail controller 130 includes a brake actuator system 675 that through the tail connector interface 660 actuates the brakes 255 of the tail braking system 160. For other trailers or vehicles towed by the trailer 210, the tail controller 130 has a supplemental brake pass through 680 configured to pass braking signals to the tail braking systems 160 of the trailers 210 being towed so that the braking can be coordinated between the automobile 205 and the trailers 210.

Two wheel or brake sensing configurations for the automobile-trailer system 200 will now be described with reference to FIGS. 7 and 8. While these wheel sensing configurations are illustrated separately, these wheel sensing configurations can be combined together in the automobile-trailer system 200 so as to be used in tandem to enhance brake sensing capabilities. As will be described in greater detail below, the individual brakes 255 in the tail braking system 160 of the trailer 210 are configured to be operated independently of one another by the control subsystem 115. Among other things, this can help enhance braking as well as stability of the tail vehicle 110. In one example, the brakes 255 of the trailer 210 include electrically operated solenoids. The brakes 255 in this example are normally driven by a 20 amp high-side current source from the tail controller 130 in the automobile 205. This current in one variation is applied evenly to all of the brakes 255 of the trailer 210. In the illustrated example, the trailer 210 includes six (6) trailer wheels 250 with each having one of the brakes 255. The trailer 210 in other examples can include more or less trailer wheels 250 and brakes 255 than is shown. To actuate the brakes 255 independently, the brake actuator system 675 has a number of switches that match the number of brakes 255. Returning to the illustrated example for instance, the brake actuator system 675 in the tail controller 130 includes six (6) high-side protected switches to control up to six (6) brakes 255 independently. In one particular example, the switches that form the brake actuator system 675 include an Infineon BTS6143 smart high side switch that is tied to each brake actuator for the brakes 255.

Figure 7:
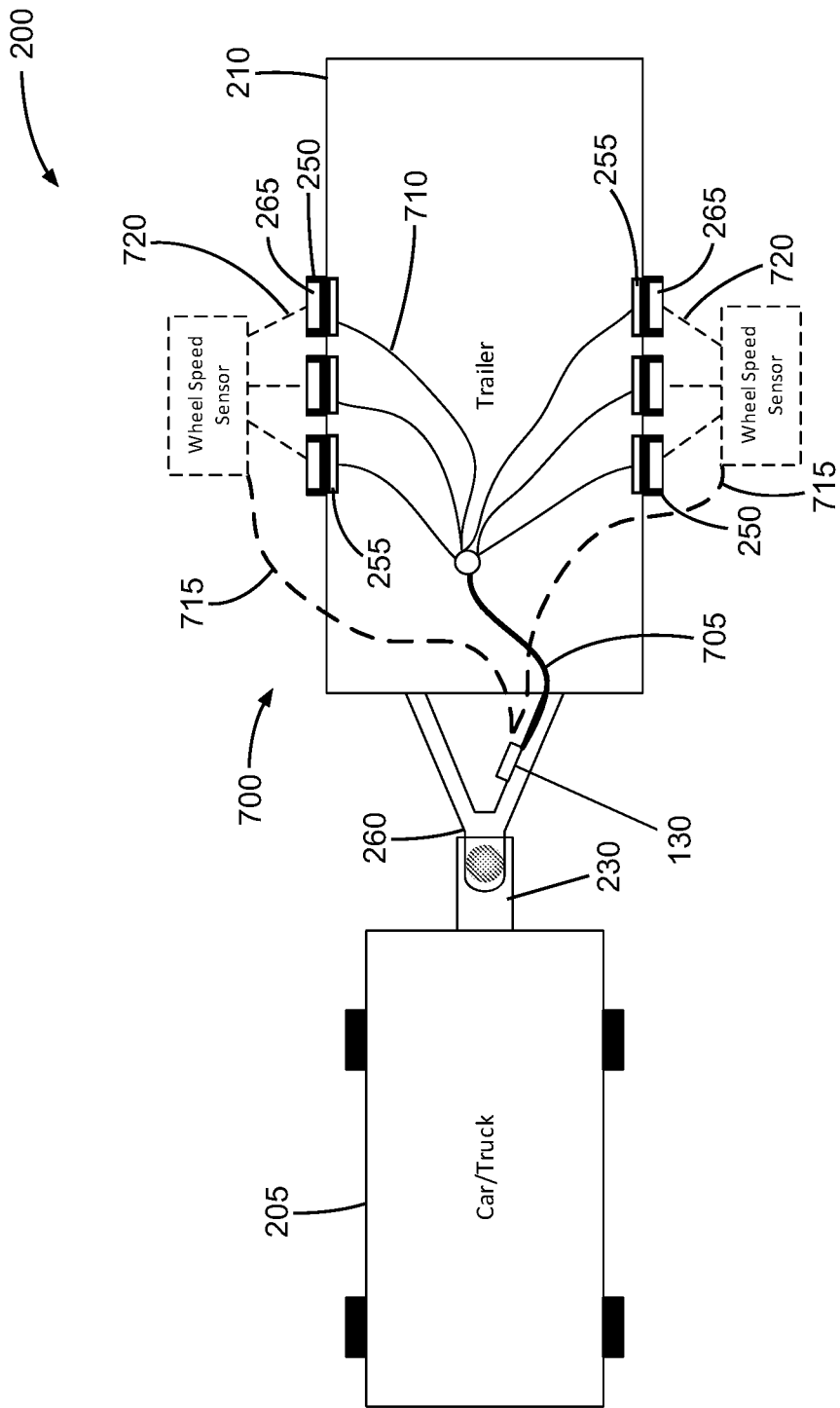
FIG. 7 is a diagrammatic view of a wheel speed sensor system in the FIG. 2 automobile-trailer system.

Looking at FIG. 7, a wheel speed sensor system 700 of the automobile-trailer system 200 includes a brake harness 705 with one or more brake harness wires 710 connected to each of the brakes 255. The other end of the brake harness 705 is connected to the brake actuator system 675 through the tail connector interface 660 in the tail controller 130 (FIG. 6). With this configuration, the tail controller 130 is able to independently actuate the brakes 255. The wheel speed sensor system 700 further includes the wheel speed sensors 265. In one example, the wheel speed sensors 265 include hall effect sensors. Inputs are provided for hall effect sensor inputs. These inputs are connected to a toothed wheel on each trailer wheel 250 or brake drum on the brakes 255. In one case, the toothed wheel can include a trigger disk like in an ABS for a vehicle, but the toothed wheel can be configured differently. For example, the toothed wheel can replaced with vent fins on the brake drum or some other periodic metallic object that rotates with the trailer wheel 250. As can be seen, the tail controller 130 is connected to one or more wheel sensor harnesses 715 with wheel sensor harness wires 720 that are connected to the individual wheel speed sensors 265. During use, the processor 610 of the tail controller 130 measures a period between rising edges of the wheel speed sensors 265 to obtain individual wheel speed. This measurement is read in to a counter timer unit of the processor 610. The head controller 120 and/or tail controller 130 stores the wheel diameter. With the wheel diameter, the head controller 120 and/or tail controller 130 is able to estimate the speed of the individual trailer wheels 250. In one form, the tail controller 130 via the processor 610 determines the wheel speed and transmit the wheel speed data to the head controller 120. When the wheel diameter is unknown, the control subsystem 115 is still able to detect differences in wheel speed between the trailer wheels 250 and detect wheel lockup.

Figure 8:
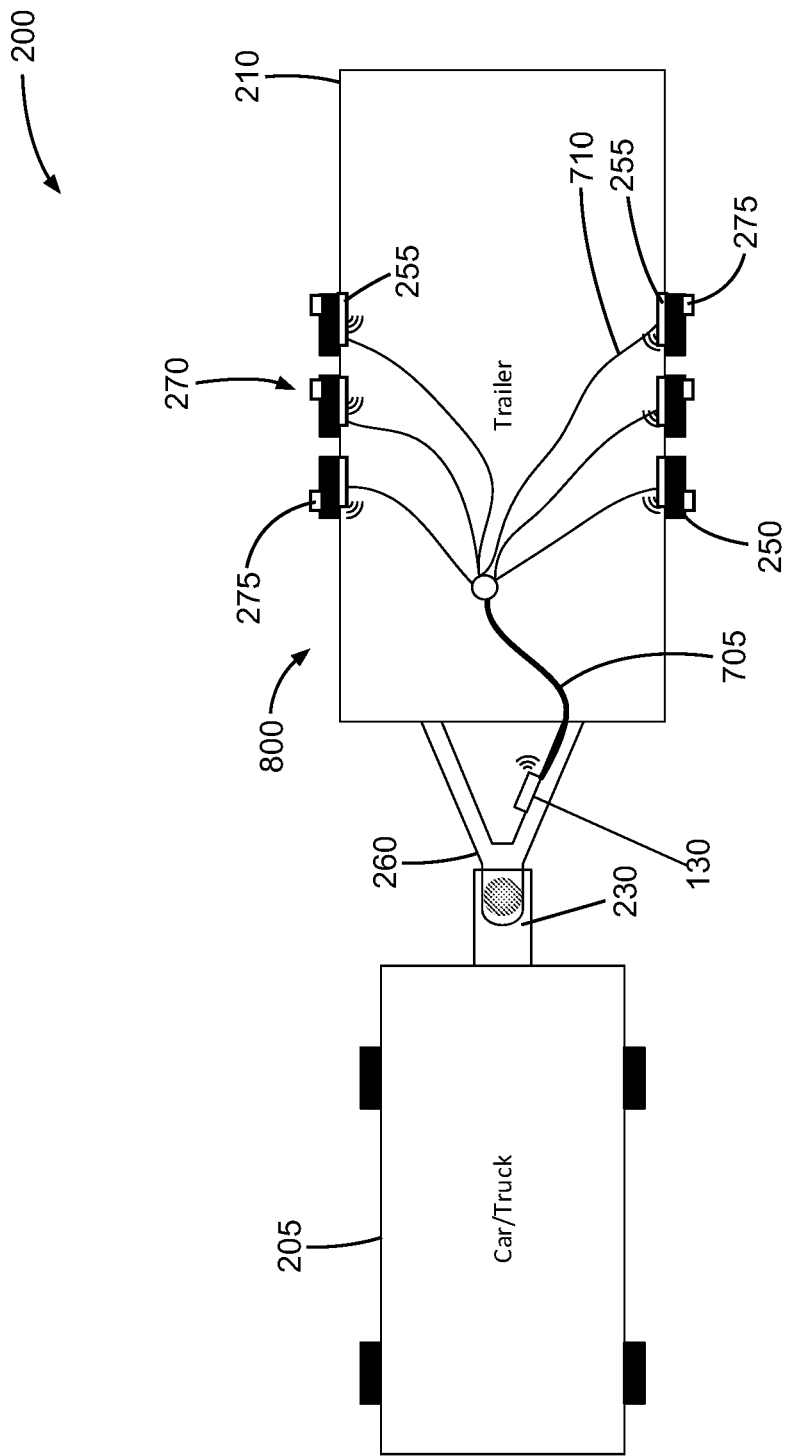
FIG. 8 is a diagrammatic view of a TPMS system in the FIG. 2 automobile-trailer system.

FIG. 8 shows another example of a TPMS system 800 which can be incorporated into the automobile-trailer system 200. Like in FIG. 7, the brake harness 705 with the brake harness wires 710 operatively connects the tail controller 130 to the brakes 255 so that the control subsystem 115 is able to independently control the brakes 255. To reduce the need of retrofitting the wheel sensor harnesses 715 and wheel speed sensors 265 to the trailer 210, the tail controller 130 uses the TPMS sensors 275 of the TPMS 270 to sense individual speed of the trailer wheels 250. The TPMS sensors 275 are battery powered sensors installed inside the trailer wheels 250 to detect if a tire is flat. TPMS can be generally categorized into two different types, direct TPMS (dTPMS) and indirect TPMS (iTPMS). The dTPMS types include pressure sensors mounted on each wheel, either internally or externally to the wheel. The dTPMS sensors physically measure the tire pressure in each tire and for example report the pressure readings to an instrument cluster in the vehicle. The iTPMS types do not use physical pressure sensors but indirectly measure air pressures by monitoring individual wheel rotational speeds and other signals available outside of the tire. For example, iTPMS types can indirectly measure pressure through wheel speed sensors of Antilock Braking Systems (ABS).

In this example, the TPMS sensors 275 are iTPMS type sensors with chips that have built-in accelerometers to detect wheel rotation. The TPMS interfaces are relatively standard, so TPMS 270 can be used to detect wheel speeds. Most TPMS sensors 275 are designed for wireless communication. In the illustrated example, each of the TPMS sensors 275 wirelessly communicate with the low speed network interface 655 in the tail controller 130. The RF portion of the TPMS is universal at the hardware and protocol layer, so the tail controller 130 can talk to a wide variety of TPMS sensors. With this construction, the tail controller 130 can interface with known types of TPMS chips to get wheel speed without the difficulties associated with mounting hall sensors. Additionally, tire pressure of the trailer wheels 250 in the trailer 210 can be communicated to the driver through the data link between the head controller 120 and tail controller 130. For instance, the measured tire pressures can be displayed via the I/O devices 125 of the head controller 120.

The TPMS sensors 275 generally come in two standard forms. There are built-in ones that are located inside the tire, which are typically part of the valve stem, and aftermarket TPMS sensors are typically incorporated into a valve cap for the tire. In one variation, the chip for a TPMS sensor can be glued onto the brake 255 such that, while the TPMS chip does not accurately measure pressure, the TPMS chip for the wheel speed sensors 265 can measure acceleration and infer wheel speed. With the wheel speed sensors 265 exposed in this example, the batteries for the wheel speed sensors 265 can be readily replaced (or the whole wheel speed sensor 265 can be replaced) by the end user. Each time the wheel speed sensor 265 provides a reading, the battery power of the wheel speed sensor 265 is drained. To conserve energy and extend the operational life of the wheel speed sensors 265, the tail controller 130 in the FIG. 7 wheel speed sensor system 700 in one example is designed to only read when the brakes 255 are applied. The tail controller 130 further uses an adaptive sampling rate depending on the brake current sensed by the brake actuator system 675 via the brake harness 705 and the sample time learned from previous situations.

With both the wheel speed sensor system 700 of FIG. 7 and the TPMS system 800 of FIG. 8, the sensed wheel speed can be beneficially used in a wide variety of situations. For example, the control subsystem 115 can determine whether the automobile 205 is on a dirt, gravel, or paved road depending on the cycle to cycle variations in acceleration of the trailer wheels 250. When wheel slipping occurs, such as on dirt or gravel roads, the wheel acceleration dramatically changes. With these fluctuations of wheel acceleration, the head controller 120 and/or tail controller 130 is then able to determine the road type and/or road conditions (e.g., rain, snow, etc.). Based on this information, the control subsystem 115 is able to switch between various braking characteristics. For instance, when the control subsystem 115 detects that the trailer 210 is on a dirt or slippery road, the control subsystem 115 can switch to a more aggressive braking mode for the trailer 210 so as to compensate for the longer stopping conditions.

In conjunction with the sensed wheel speed, the acceleration and direction information from the head IMU 122 and the tail IMU 132 can be used for stability or anti-sway control for the trailer 210. With this information, the control subsystem 115 is able to individually apply the brakes 255 to reduce sway of the trailer 210. Using this antisway technique, the head unit 116 and/or tail unit 118 is able to detect oscillatory motion via the tail IMU 132 alone or in combination with information from the head IMU 122 in the automobile 205. Upon detection of the trailer oscillation, the control subsystem 115 acts to counter the motion by dampening the motion out by braking the trailer wheels 250 differently on either side of the trailer 210 and/or by different braking combinations for the individual trailer wheels 250. Having the head IMU 122 in the trailer 210 (and/or tail IMU 132 in the automobile 205) including a nine (9) axis accelerometer/gyroscope, the sway with respect to the trailer 210 can be more precisely determined. When the control subsystem 115 through the head IMU 122 and/or tail IMU 132 determines that the trailer 210 is lined up properly with the automobile 205, the trailer 210 is pointed in the right direction, and the control subsystem 115 does not have to take dramatic actions to minimize the oscillations or swaying of the trailer 210. To further improve alignment and reduce swaying, a dynamics model of the trailer 210 running in real-time on the tail controller 130 can be developed based on measured real world data. In one example, a parameterized Simscape Dynamics model is auto-coded to the tail controller 130. The parameters for this model can come from user input (e.g., length of trailer, weight, etc.), learned parameters (e.g., suspension stiffness), and current environmental parameters (e.g., assumptions of road conditions). In the cases where only the trailer 210 has the tail controller 130 (and the automobile 205 lacks the head controller 120), the tail unit 118 is still able to do stability control with the learned model.

Referring to FIGS. 1-8, tongue weight or the weight of the tow coupler 260 applied to the automobile 205 is critical to the proper stable towing of the trailer 210. The head IMU 122 in the automobile 205 and/or the tail IMU 132 in the trailer 210 are helpful in estimating this tongue weight. Through the head IMU 122 and/or tail IMU 132, the control subsystem 115 is able to measure the pitch of the automobile 205 and trailer 210 before and after loading. Based on the dimensional and other physical characteristics of the automobile 205 and trailer 210, the head controller 120 and/or tail controller 130 can estimate the tongue weight from change of pitch of the automobile 205 and/or trailer 210. In one embodiment, the control subsystem 115 and/or an external server maintains a database that includes information about the automobile 205 under various tongue weights and associated pitches. With this data, the control subsystem 115 is able to convert the measured pitch from the head IMU 122 and/or tail IMU 132 into a tongue weight estimate. The estimated tongue weight can be reported to the user through the I/O devices 125 and/or the control subsystem 115 can take appropriate corrective action such as adjusting braking levels based on the estimated tongue weight.

In some cases, information concerning the particular model of the automobile 205 may not be in the database. When this occurs, the control subsystem 115 then resorts to a unique calibration technique. This technique typically involves applying weight, such as a few hundred pounds, to the head tow hitch 230 and/or back bumper of the automobile 205. For instance, the I/O devices 125 of the control subsystem 115 can provide a suggested weight to apply and the location of where to apply the weight to the automobile 205. Before and after applying the weight, the user can press a button or otherwise indicate through the I/O devices 125 that the control subsystem 115 is entering a weight test or estimation mode. In another variation, the user enters the weight, location, and time after conducting the test. For instance, three (3) individuals may stand on the bumper of the automobile 205 during the test. In one case, as each individual steps onto the automobile 205, the head controller 120 measures the resulting pitch from the head IMU 122 and compares the pitch to the entered weight of the individual. The subsequent individuals joins the ones already on the automobile 205, and the control subsystem 115 compares the pitch and added individual weight at each instance. The tail controller 130 is then able to develop a model (e.g., through regression techniques) that is used to estimate the tongue weight based on the pitch. In another case, all three (3) individuals (or more) stand on the automobile 205 at the same time, and the head unit 116 develops a model or updates an earlier model based on the unloaded and loaded pitches as well as the applied weight. The collected data from the test is then be used by the control subsystem 115 to estimate the tongue weight. This collected data and model information can also be incorporated into the database for improving future estimates.

The estimated tongue weight can be used to properly position cargo on or within the trailer 210 so that the trailer 210 is not overly front, side, or back loaded. The control subsystem 115 further provides a dynamic mode to assist in positioning cargo and other loads on the trailer 210 like earth moving equipment on flatbed trailers. Based on the real-time pitch of the automobile 205 and/or trailer 210 measured by the head IMU 122 and/or tail IMU 132 as the cargo is moved on the trailer 210 (e.g., forwards or backwards), the head controller 120 and/or tail controller 130 is able to estimate dynamic weights being applied. In one example, the I/O devices 125 displays the real-time weight estimate via a mobile app on a mobile device as the cargo moves forward or backwards on the trailer 210, thereby enabling the loader to position the cargo correctly on the trailer 210. Of course, this same technique can be applied to other dynamic loading processes.

Improper trailer braking can lead to dangerous driving conditions. However, determining how much brake force to apply to the brakes 255 of the trailer 210 is rather difficult. Some proposed designs require force sensors around the tow hitch which can be an expensive proposition, and these force sensors can be readily damaged. The control subsystem 115 described herein uses an indirect approach that is easy to retrofit to existing vehicles and is inexpensive. In this indirect technique, both the head IMU 122 on the automobile 205 and the tail IMU 132 on the trailer 210 are used to measure pitches of the head tow hitch 230 and tow coupler 260. Under braking, the automobile 205 will pitch forward when insufficient trailer braking occurs, and the automobile 205 will pitch backwards when too much trailer braking is applied. With the dynamic pitch measurements from the head IMU 122 and the tail IMU 132, the control subsystem 115 dynamically maintains the relative pitch of both automobile 205 and trailer 210 within a designated pitch range so that the brakes 222 of the automobile 205 and the brakes 255 of the trailer 210 are applied correctly.

For instance, when the head controller 120 through the head IMU 122 detects an excessive forward pitch to the automobile 205, the head unit 116 sends an instruction to the tail unit 118 to apply greater braking force to the brakes 255 in the tail braking system 160. In another variation, when the tail controller 130 through the tail IMU 132 senses an excessive backward pitch of the trailer 210, which is indicative of under braking by the trailer 210, the tail controller 130 of the tail unit 118 can automatically (e.g., without instructions from the head unit 116) apply greater braking force to the brakes 255 of the trailer 210.

On the other hand, when the head controller 120 through the head IMU 122 detects an excessive backward pitch of the automobile 205, which is indicative of excessive trailer braking, the head unit 116 sends an instruction to the tail unit 118 to apply less braking force to the brakes 255 in the tail braking system 160. In another variation, when the tail controller 130 through the tail IMU 132 senses an excessive forward pitch of the trailer 210, which is also indicative of under braking by the trailer 210, the tail controller 130 of the tail unit 118 can automatically (e.g., without instructions from the head unit 116) apply less braking force to the brakes 255 of the trailer 210. As will be explainer further below, user calibration and/or learned brake limits can be also applied to this technique.

Under hard braking conditions, if the trailer 210 is not braking hard enough, the trailer 210 will also tend to push the automobile 205 sideways. The control subsystem 115 is able to detect this sideways motion by the orientation and acceleration measurements from the head IMU 122 and the tail IMU 132. In the case where the relative horizontal angles between the automobile 205 and trailer 210 change outside a limit, the head controller 120 instructs the tail controller 130 to apply additional braking to the tail braking system 160 or the tail controller 130 automatically applies additional braking to the brakes 255 of the trailer 210 (along with stability control, if so required).

Locking of the brakes 255 in the trailer 210 can also be dangerous. When the brakes 255 of the trailer 210 lock, there is less brake force available. The control subsystem 115 is configured to use an anti-lock brake technique when the brakes 255 are locked. As noted above, one of the unique features of the tail unit 118 is the ability to independently control the force applied to each of the brakes 255 in the trailer 210. With this independent control capability, when an individual trailer wheel 250 locks up, the braking force applied to the brakes 255 for that trailer wheel 250 is reduced so that the trailer wheel 250 is no longer skidding. As should be recognized the tail unit 118 is able to reduce the braking force independently to multiple brakes 255 in the trailer 210 at the same time to eliminate lock up or skidding of the trailer wheels 250. As should be recognized, wheel lock up can be detected when the wheel speed sensors 265 and/or TPMS sensors 275 sense the trailer wheels 250 are not moving (i.e., have a speed of zero).

As noted before, user calibration is sometimes required for the control subsystem 115 to ensure proper braking. The control subsystem 115 is designed to enter a user calibration mode when the user performs the calibration acts. When needed, the control subsystem 115 via the I/O devices 125 will offer a user calibration mode where the user can pick a safe spot (e.g., a flat, empty parking lot) and calibrate how much pitch the user wants and also test the brake force. During user calibration, the brakes 255 of the trailer 210 are manually applied until the trailer wheels 250 start to lock up, and when the lock up occurs, the head controller 120 and/or tail controller 130 records the relative pitch from the head IMU 122 and/or tail IMU 132. This pitch data can then be used by the control subsystem 115 to develop a brake lock up model. During this calibration mode the amount of current to cause each brake 255 of the trailer 210 to lock up is measured and if the applied current to each brake 255 is not approximately the same as the others, the control subsystem 115 through the I/O devices 125 issues a warning to the user to perform brake maintenance. In a multi axle trailer 210, the brakes 255 for the axles may be actuated individually to determine the brake current as compared to the brake force for each brake 255. During this calibration test, an even force is applied to each brake 255, and the control subsystem 115 measures the sway of the trailer 210 through the tail IMU 132. If the trailer 210 sways, then the brakes 255 in the trailer 210 are uneven. Alternatively or additionally, the tail IMU 132 measures the amount of pitch of the trailer 210 for the same braking force for each axle, and the control subsystem 115 compares the values for each axle. The control subsystem 115 in other variations measures the amount of braking force (e.g., through braking current) required to lock up each trailer wheel 250 in the trailer 210. Any combination of these calibration tests or measurements can be used for calibration of the brakes 255 in the trailer 210. From this calibration information, the control subsystem 115 is able to develop braking models that can be used to adjust the operational parameters for the brakes 255 in the tail braking system 160. For example, the braking force applied to each trailer wheel 250 of the trailer 210 can be different depending on these calibration measurements.

The control subsystem 115 is also configured to provide unique crawl control capabilities. For example, when going down a steep slope (especially on dirt or snow), the trailer 210 will tend to push the automobile 205. For standard vehicles, trying to balance the braking force between the towing vehicle and trailer may be difficult since the brake setup is usually performed on flat ground, and the terrain as well as the slope of the road create nonlinear braking effects that are not easily modeled.

When approaching a steep slope or other dangerous road conditions, the driver of the automobile 205 is able to set the control subsystem 115 into a crawl control mode. With the I/O devices 125, such as by pressing a crawl control button or icon, the user is for example able to set the control subsystem 115 into the crawl control mode. In this crawl control mode, the user sets a desired speed such as in a fashion to setting cruise control. At this speed, the tail unit 118 automatically starts applying the brakes 255 of the trailer 210 regardless of the status of the brake pedal in the automobile 205. There is a speed differential window between the automobile 205 and trailer 210, such as around 3 mph, where vehicle drivers go from no braking to full braking (i.e., just short of lock up) of the trailer 210. This crawl control mode of the control subsystem 115 keeps the trailer 210 under control. The issued brake command from the tail controller 130 is set to the maximum of the brake command from the automobile 205 and crawl control brake command for the trailer 210. When travelling down a steep, twisty dirt road in the crawl control mode, the trailer 210 will normally provide some braking action and keep the automobile 205 and trailer 210 at a slow, safe speed and not break loose from one another. Once the automobile 205 reaches more level ground, the driver can deactivate the crawl control mode of the control subsystem 115 by for example again pressing the crawl control mode button or icon of the I/O devices 125.

As will be explained below, the control subsystem 115 is designed to perform a number of auto detect functions that, among other things, can be useful when different types and/or multiple trailers 210 are towed by the automobile 205. For example, the control subsystem 115 can override some functionalities dependent on the type of wiring harness cable 237 used to connect the trailer 210. The control subsystem 115 also facilitates safe multi-trailer modes which allows additional trailers 210 to be plugged into the trailer 210 being directly towed by the standard control automobile 905. As mentioned before, the trailer 210 can be connected for example to the trailer 210 with either the 4-pin or 7-pin standard trailer connectors. In either case, functions can be overridden with CAN commands. The head controller 120 is able to detect whether the connected trailer 210 is a conventional trailer (i.e., one without the tail unit 118) or one with the tail unit 118. In one technique, the resistive load of the brakes 255 in the trailer 210 is used to detect that a conventional trailer is attached. For instance, if head unit 116 determines that the brake harness 705 and/or brake harness wires 710 have a high impedance, then the head controller 120 initiates a handshake to establish communication with the tail unit 118 of the tail vehicle 110. This technique is performed by the head connector 155 with every trailer 210 in the line in succession.

The control subsystem 115 in some forms uses a packet switched network where messages conveyed across the wiring harness cable 237 may be used directly by the head controller 120 or tail controller 130, or passed on to additional modules across a similar 1-wire CAN bus (e.g., via the low speed network interface 370 or the supplemental CAN interface 670) or different bus (e.g., CAN, Bluetooth, RS-232, Ethernet, etc.). As mentioned before, the tail unit 118 acts as a gateway to other networked devices on the trailer 210. In this way additional devices may be connected to the control subsystem 115 such as devices by the manufacturer of the tail unit 118 or potentially third party suppliers. For instance, this gateway formed by the tail unit 118 may connect to Bosch and/or Continental brand lane departure devices. This gateway may also for example be used for parking sensors (see e.g., FIGS. 17 and 18) and/or to a future smart refrigerator.

As noted before with respect to FIG. 6, the tail controller 130 in the trailer 210 includes the wireless interface 645. The wireless interface 645 in some embodiments acts a BluetoothLE gateway for wireless sensors 165 and a CAN Flexible Data (FD) network for wired devices. The head controller 120 and tail controller 130 each respectively includes the high speed network interface 365 and high speed network interface 650. In one embodiment, the high speed network interface 650 in each trailer 210 acts as an Ethernet switch to bridge from a BroadR network to a standard RJ45 type (802.3) wired Ethernet network and additional BroadR devices on this trailer 210 and following trailers 210. In the head controller 120 of the automobile 205, the BroadR to 802.3 or 802.11 Wi-Fi bridge formed with the high speed network interface 365 allows cameras or other high-speed devices to communicate in a secure manner between the automobile 205 and trailer 210.

Once more, multiple trailers 210 may be connected in series. Messages to the further back trailer 210 pass through the intermediate trailer 210 so that the head unit 116 in the automobile 205 knows what automobile 205 the message came from. Auto-identification of the trailer 210 is achieved by the order the trailers 210 are plugged into the other trailers 210 or the automobile 205. The automobile 205 and trailer 210 can be identified by sharing keys generated by the local I/O device 335 in the head controller 120 and the security key generator 640 in the tail controller 130.

The control subsystem 115 is configured to operate with a whole host of trailer combinations. The control subsystem 115 is designed to at least partially function even when vehicles or trailers do not incorporate key components of the control subsystem 115. Starting with FIG. 9, several vehicle and trailer combinations are illustrated, and some of the functionality of these combinations will be described below. As a general note about the drawings, when the term "with TOAD" or similar phrase is used, this means that the designated vehicle (e.g., the automobile or trailer) has the corresponding portion of the control subsystem 115 described herein installed. The term "with standard" or similar phrase generally refers to a vehicle that does not have the appropriate portion of the control subsystem 115 installed for that vehicle. In other words, the vehicle is the conventional one typically provided by the OEM.

Figure 9:
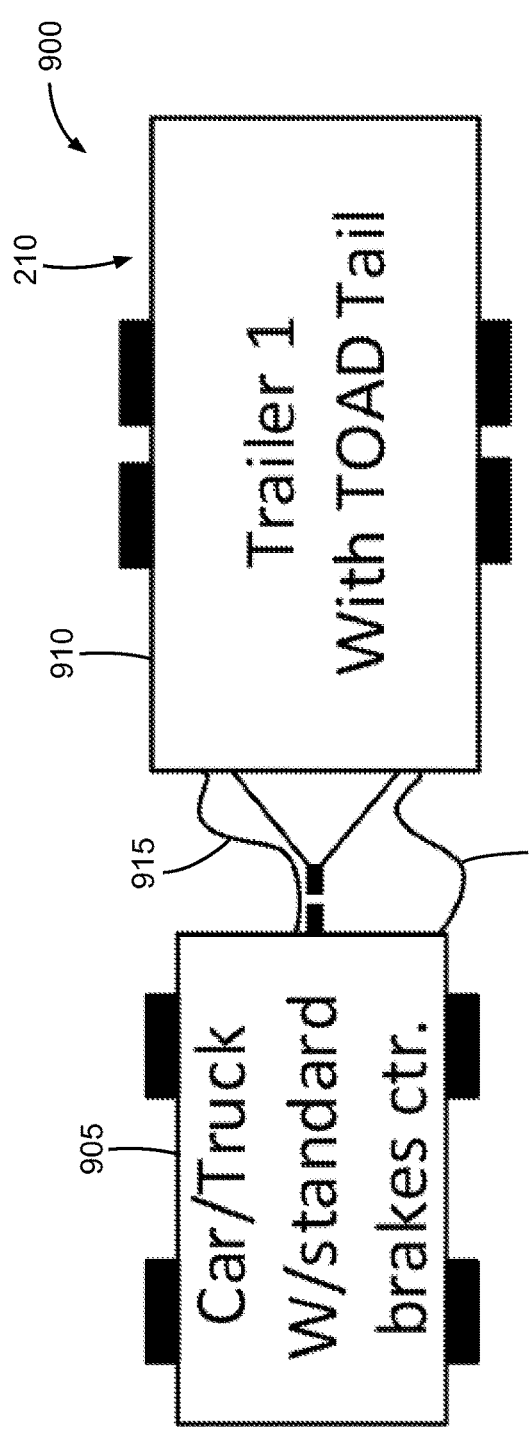
FIG. 9 is a diagrammatic view of an automobile-trailer system with a standard control automobile and a first tail control trailer.

FIG. 9 shows an automobile-trailer system 900 that includes a standard control automobile 905 and a first tail control trailer 910 being mechanically connected and towed in a fashion like in FIG. 2. The standard control automobile 905 in this example is a standard vehicle that does not have the head unit 116. On the other hand, the first tail control trailer 910 is configured in the same fashion as the trailer 210 in FIG. 2 in that the first tail control trailer 910 includes the tail unit 118 with the tail controller 130. As can be seen, the standard control automobile 905 and first tail control trailer 910 are operatively connected together via a high speed trailer harness 915 and a low speed trailer harness 920. While the high speed trailer harness 915 and the low speed trailer harness 920 are illustrated as separate cables, the high speed trailer harness 915 and the low speed trailer harness 920 can be combined in a single cable or harness like the wiring harness cable 237 in FIG. 2. In the first tail control trailer 910, the high speed trailer harness 915 is operatively connected to the high speed network interface 650 in the tail controller 130, and the low speed trailer harness 920 is operatively connected to the low speed network interface 655 in the tail unit 118 (FIG. 6). For the standard control automobile 905, the high speed trailer harness 915 and low speed trailer harness 920 are connected in a conventional manner for that particular standard control automobile 905.

Even though the standard control automobile 905 lacks the head unit 116, the first tail control trailer 910 via tail unit 118 is still able to monitor various parameters and perform a number of functions. For example, the tail controller 130 via the TPMS interface 620 and/or wheel speed sensor interface 665 (FIG. 6) are still able to monitor the speed of the trailer wheels 250 via the TPMS sensors 275 (FIG. 8) and/or the wheel speed sensors 265 (FIG. 7). With this ability to monitor wheel speed, the tail unit 118 is able to perform the stability control and auto-brake functions in which the first tail control trailer 910 is stopped or prevented from running into objects via an array of parking sensors (see the discussion for FIGS. 16 and 17). An individual is still able to interact with and control the tail unit 118 through their mobile phone or other wireless device by communicating (e.g., via Bluetooth®) with the wireless interface 645 in the tail controller 130.

Figure 10:
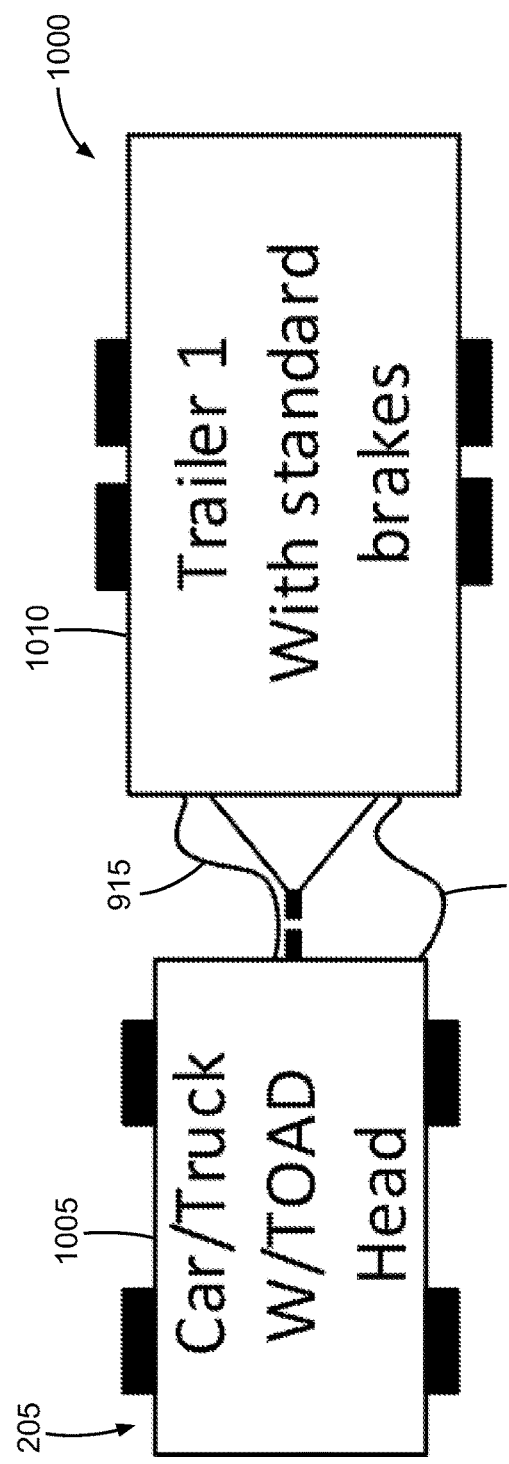
FIG. 10 is a diagrammatic view of an automobile-trailer system with a head control automobile and a first standard control trailer.

FIG. 10 shows an automobile-trailer system 1000 including a head control automobile 1005 and a first standard control trailer 1010 that is mechanically connected and towed in a fashion described above. In this illustrated example, the head control automobile 1005 is configured in the same fashion as the automobile 205 in FIG. 2. For instance, the head control automobile 1005 includes the head unit 116 with the head controller 120. The first standard control trailer 1010 in this case includes a standard braking system, and the first standard control trailer 1010 does not include the tail unit 118. Like in the previous example, the head control automobile 1005 and the first standard control trailer 1010 are operatively connected together with the high speed trailer harness 915 and the low speed trailer harness 920. In one example, the high speed trailer harness 915 is operatively connected via the head connector 155 and high speed network interface 365 in the head controller 120 (FIG. 3), and the low speed trailer harness 920 is operatively connected via the head connector 155 and low speed network interface 370 in the head unit 116. In this example, the head controller 120 in the head control automobile 1005 functions as a standard brake controller. The head unit 116 in other words actuates the brakes and performs the other functions of the tail vehicle 110 in accordance with the braking system of the manufacturer. In this case, the I/O devices 125, such as the remote actuation control 320 and remote display 330, still function, however.

Figure 11:
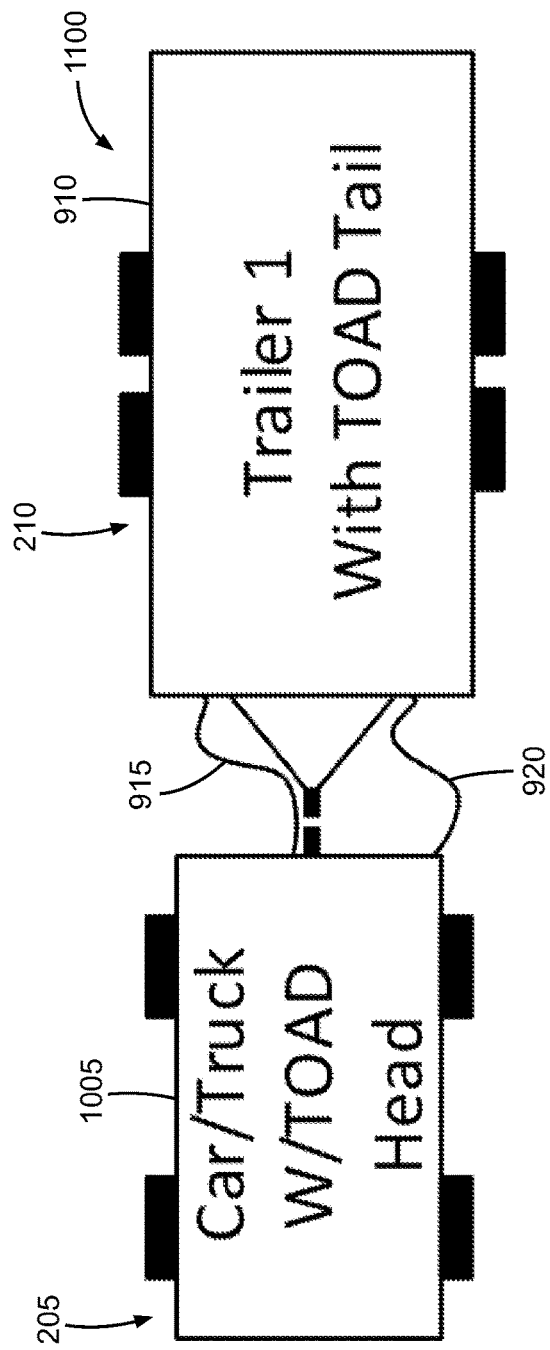
FIG. 11 is a diagrammatic view of an automobile-trailer system with a head control automobile and a first tail control trailer.

FIG. 11 corresponds to the same set up for the automobile 205 and trailer 210 illustrated in FIG. 2. In particular, an automobile-trailer system 1100 in FIG. 11 includes the head control automobile 1005, which corresponds to the automobile 205 in FIG. 2, and the first tail control trailer 910, which corresponds to the trailer 210 in FIG. 2, that is mechanically towed by the head control automobile 1005 in the same fashion described above with respect to FIG. 2. In other words, the head control automobile 1005 has the head unit 116, and the first tail control trailer 910 has the tail unit 118. Like before, the head control automobile 1005 and first tail control trailer 910 are operatively connected together via the high speed trailer harness 915 and low speed trailer harness 920 to form data links. The high speed trailer harness 915 via the head connector 155 operatively connects the high speed network interface 365 of the head controller 120 (FIG. 3) to the high speed network interface 650 of the tail controller 130 (FIG. 6). The automobile-trailer system 1100 functions with the full range of features described herein. The control subsystem 115 is further designed to handle multiple trailer configurations in which the automobile 205 is able to control two or more trailers that are linked together for towing by the automobile 205. Again, the control subsystem 115 has auto detect functionality to determine whether or not the linked trailers incorporate the tail unit 118 and change the available functionality based on the auto detection.

The control subsystem 115 is particularly designed to handle braking and steering of multiple trailers. When reversing with multiple trailers, the tail unit 118 in the trailer 210 can be configured to use differential braking to maintain a straight line or to curve right or left via an interface from the head unit 116. The tail IMU 132 in the tail unit 118 on each trailer 210 and the head unit 116 in the automobile 205 are used to determine the angle of the trailer 210. Based on the angle of the trailer 210, the head controller 120 uses an inverted pendulum solver to instruct each trailer 210 which brakes 255 to apply and by how much. In other words, the head unit 116 actively balances the trailer 210 through braking to make sure the line of trailer 210 remain straight or at the desired orientation. The head unit 116 maintains information about the dimensions of each trailer 210 as well as some weight information about each trailer 210. This dimensional and weight information is then used in the inverted pendulum calculations such as for example by using Newton's Second Law equations and/or Lagrange's Equations. This weight information can include the empty weight of the trailer 210, the weight learned by the control subsystem 115 through operation of the trailer 210, and/or user entered weights. As mentioned before the security key generator 640 in the tail controller 130 of the trailer generates a key that can uniquely identify the trailer 210. The head controller 120 can maintain a database of the user entered and/or system determined weight (an external database can also be used). In one example, the I/O devices 125, such as via a mobile app, further instruct the driver how to position the steering wheel of the automobile 205. In other variations, the control subsystem 115 communicates over the head connector 155 with the ECU 140 for the Electric Power-Assisted Steering (EPAS) or Electric Hydraulic Power Steering (EHPS) system of the automobile 205 so that the head controller 120 is able to assist or control steering in such situations. In a single trailer mode, the control subsystem 115 can be used to brake the brakes 255 differentially so that the trailer 210 turns differently than the trailer 210. This multi-trailer stability feature is able to function when moving in forward and reverse directions.

This multi-trailer control braking and steering feature can be especially helpful when backing up with multiple trailers 210. The control subsystem 115 further includes a remote operation feature that can be helpful when backing up the one or more trailers 210. In one example, the driver or other user through the I/O devices 125 first enables the external braking function from within the vehicle console 405 of the automobile 205. An outside assistant (i.e., not the driver) through a mobile device, such as an app on a mobile phone, communicating with the head unit 116 through the wireless interface 360 controls the brakes 255 of the trailer 210. In this remote operation, the outside assistant may control the brakes 255 of the trailer 210 either differentially or as a whole. This allows the outside assistant with better vision to control the movement of the trailer 210 and stop the trailer 210 exactly at the desired location (e.g., at the top of a ramp, etc.).

Starting with FIG. 12 a number of multi-trailer configurations will be described for use with the control subsystem 115. As noted before, through multi-trailer steering, multi-trailer braking, and remote operation as well as other functions, the control subsystem 115 is able to enhance the ability to operate in a multi-trailer configuration. It should be recognized that there are other potential multi-trailer combinations in which the control subsystem 115 can be beneficial.

Figure 12:
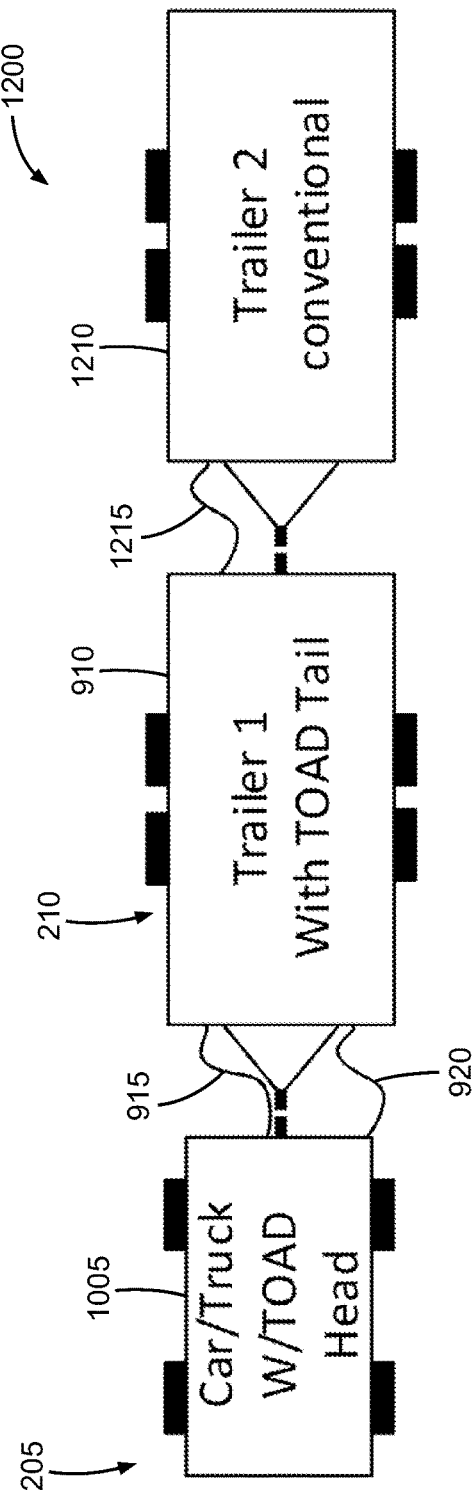
FIG. 12 is a diagrammatic view of an automobile-trailer system with a head control automobile, a first tail control trailer, and a second standard control trailer.

An automobile-trailer system 1200 in FIG. 12 includes the trailer configuration of the automobile-trailer system 1100 in FIG. 11, but the automobile-trailer system 1200 further has a second standard control trailer 1210 that is towed by the first tail control trailer 910. The tow coupler 260 of the second standard control trailer 1210 (FIG. 2) is hitched to the tail tow hitch 290 of the first tail control trailer 910. The automobile-trailer system 1200 further has a supplemental trailer harness 1215 that is connected to the tail connector 175 of the first tail control trailer 910. Through the supplemental trailer harness 1215, which is operatively coupled via the supplemental CAN interface 670 in the tail unit 118 (FIG. 6), the first tail control trailer 910 is able to communicate with and control the brakes of the second standard control trailer 1210. In the illustrated example, the second standard control trailer 1210 is a standard or conventional type trailer that lacks the tail unit 118. Once more, the head controller 120 is able to detect whether or not the second standard control trailer 1210 has the tail unit 118 based on the impedance measured from the brake lines for the second standard control trailer 1210. Even with this configuration, the control subsystem 115 is still able to provide multi-trailer stability and multi-trailer brake balancing as well as some other features.

FIG. 12 generally corresponds to the same set up for the automobile 205 and trailer 210 illustrated in FIG. 2. In particular, an automobile-trailer system 1300 in FIG. 13 includes the head control automobile 1005, which corresponds to the automobile 205 in FIG. 2, and the first tail control trailer 910, which corresponds to the trailer 210 in FIG. 2, that is mechanically towed by the head control automobile 1005 in the same fashion described above with respect to FIG. 2. In other words, the head control automobile 1005 has the head unit 116, and the first tail control trailer 910 has the tail unit 118. However, the automobile-trailer system 1300 further has a second tail control trailer 1310 that is towed by the first tail control trailer 910. The second tail control trailer 1310 incorporates the tail unit 118 of the type described above. Like before, the head control automobile 1005 and first tail control trailer 910 are operatively connected together via the high speed trailer harness 915 and low speed trailer harness 920 to form data links. The high speed trailer harness 915 via the head connector 155 operatively connects the high speed network interface 365 of the head controller 120 (FIG. 3) to the high speed network interface 650 of the tail controller 130 (FIG. 6). The supplemental trailer harness 1215 is connected to the tail connector 175 of the first tail control trailer 910. The second tail control trailer 1310 operatively communicates with the supplemental CAN interface 670 of the tail unit 118 of the first tail control trailer 910 through the supplemental trailer harness 1215 and tail connector 175. Similarly, the supplemental trailer harness 1215 is operatively coupled to the supplemental CAN interface 670 of the tail unit 118 in the second tail control trailer 1310. The head controller 120 is able to detect whether or not the second tail control trailer 1310 has the tail unit 118 based on the impedance measured from the brake harness wires 710 for the second tail control trailer 1310. With both the first tail control trailer 910 and second tail control trailer 1310 having tail units 118, the control subsystem 115 is able to provide the automobile-trailer system 1300 with multi-trailer stability and backup functions. In other words, the automobile-trailer system 1300 functions with the full range of features described herein for the control subsystem 115, including the full multi-trailer control features.

Figure 13:
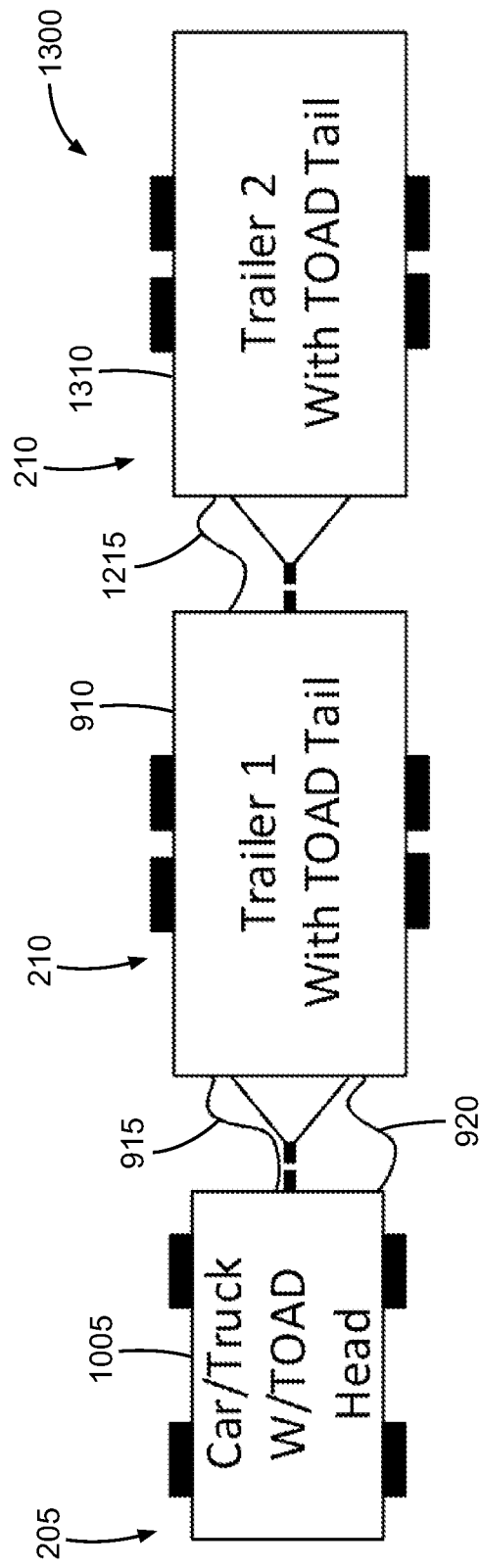
FIG. 13 is a diagrammatic view of an automobile-trailer system with a head control automobile, a first tail control trailer, and a second tail control trailer.
Figure 14:
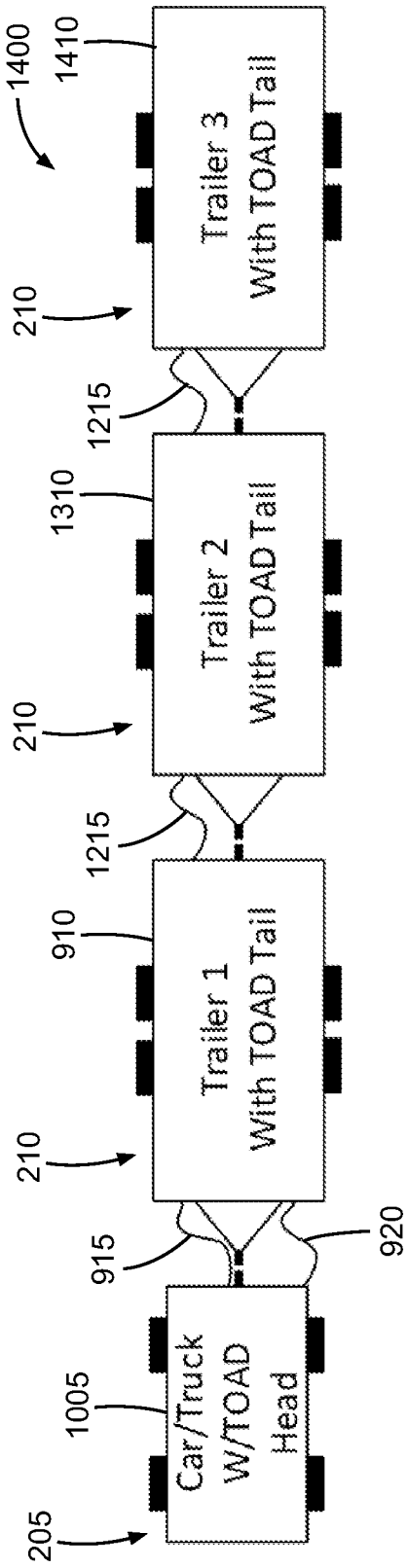
FIG. 14 is a diagrammatic view of an automobile-trailer system with a head control automobile, a first tail control trailer, a second tail control trailer, and a third trail control trailer.

FIG. 14 depicts an automobile-trailer system 1400 that generally corresponds to the automobile-trailer system 1300 in FIG. 13, but the automobile-trailer system 1400 in FIG. 14 has a third trail control trailer 1410. As before, the control subsystem 115 is able to detect whether or not the third trail control trailer 1410 has the tail unit 118 based on the impedance measured from the brake harness wires 710 for the third trail control trailer 1410. In the illustrated example, the third trail control trailer 1410 includes the tail unit 118. The third trail control trailer 1410 is able to be securely identified by the key generated by the security key generator 640. The automobile-trailer system 1400 in FIG. 14 functions with the full range of features described herein for the control subsystem 115, including the full multi-trailer control features.

Figure 15:
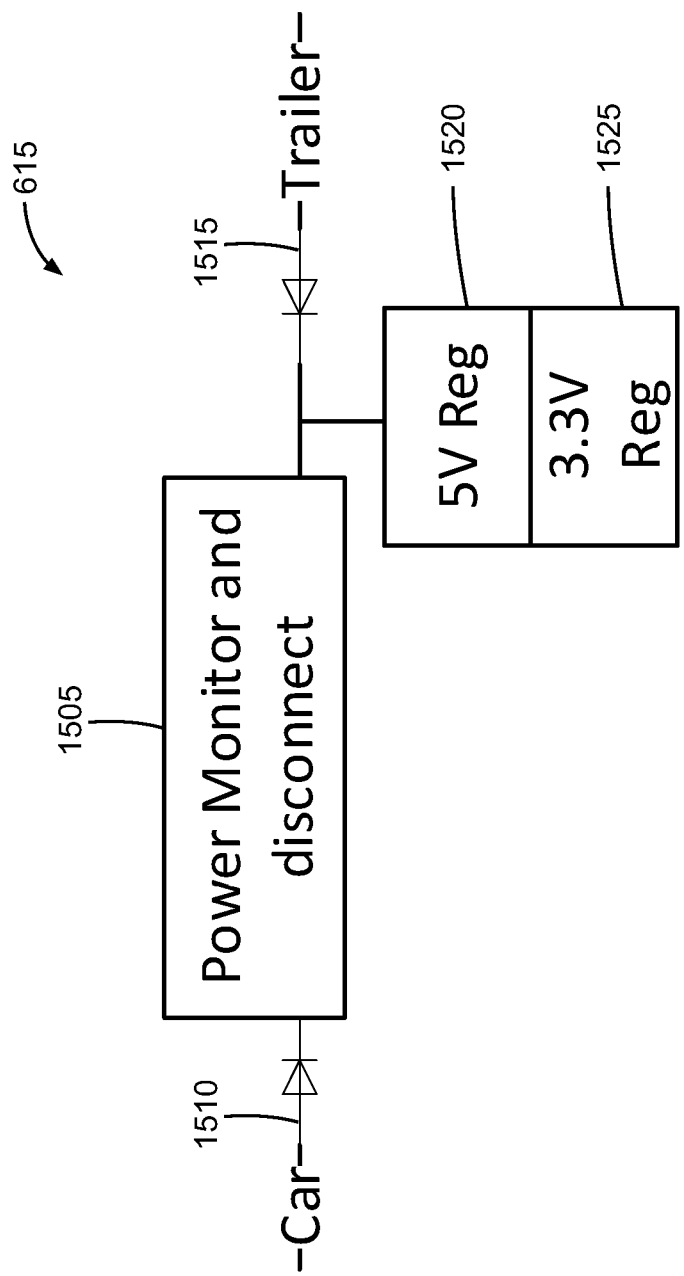
FIG. 15 is a diagrammatic view of a power disconnect monitor in the FIG. 6 tail unit.

Turning to FIG. 15, in numerous applications, it is again common to run a battery of the trailer 210 low after a few days of camping or other activities with loads like lights, cell phone chargers, televisions, and the like. If the trailer 210 is plugged into the automobile 205 for this whole time, the trailer 210 will also drain the battery of the automobile 205 thereby preventing starting of the automobile 205. On the other hand, it is desirable to leave the automobile 205 plugged in for some amount of time every day to recharge the batteries of the trailer 210. Looking at FIG. 15, the tail controller 130 includes a unique power disconnect monitor 615 that addresses these as well as other issues. With the power disconnect monitor 615 integrated into the tail controller 130, both disconnect monitoring and communication are packaged in the same place (i.e., the tail controller housing 605). As shown, the power disconnect monitor 615 includes a power monitor 1505 that is connected to a head vehicle power sensor line 1510 from the automobile 205 and a tail vehicle power sensor line 1515 from the trailer 210. Depending on the voltages used on the automobile 205 and trailer 210, the power disconnect monitor 615 further utilizes a head vehicle voltage regulator 1520 and a tail vehicle voltage regulator 1525.

Once more, the power disconnect monitor 615 is able to monitor the voltage of both the head vehicle 105 through the head vehicle power sensor line 1510 and the tail vehicle 110 through the tail vehicle power sensor line 1515 as well as the current draw. The power disconnect monitor 615 occasionally opens a switch between the automobile 205 and trailer 210 to monitor the state of charge of the batteries. The tail vehicle power sensor line 1515 includes a current sensor and controller to monitor the amount of current being pulled and the status of the battery. The processor 610 is then able to report this to the user and/or to the head unit 116. The power disconnect monitor 615 is configured to determine when the battery of the automobile 205 is drawn down to a certain percentage charge (e.g., 80%) and then disconnect the battery of the automobile 205. The power disconnect monitor 615 is also able to adapt for the type of battery being used. For example, the power disconnect monitor 615 is configured to monitor standard models of a lead acid batteries and alternate battery types like AGM type batteries. When a switch in battery type occurs, the user through the I/O devices 125 indicates the change, and the head unit 116 or tail unit 118 uses a lookup table to selects a difference in the voltage vs. charge static and the state of charge tracking model.

Figure 16:
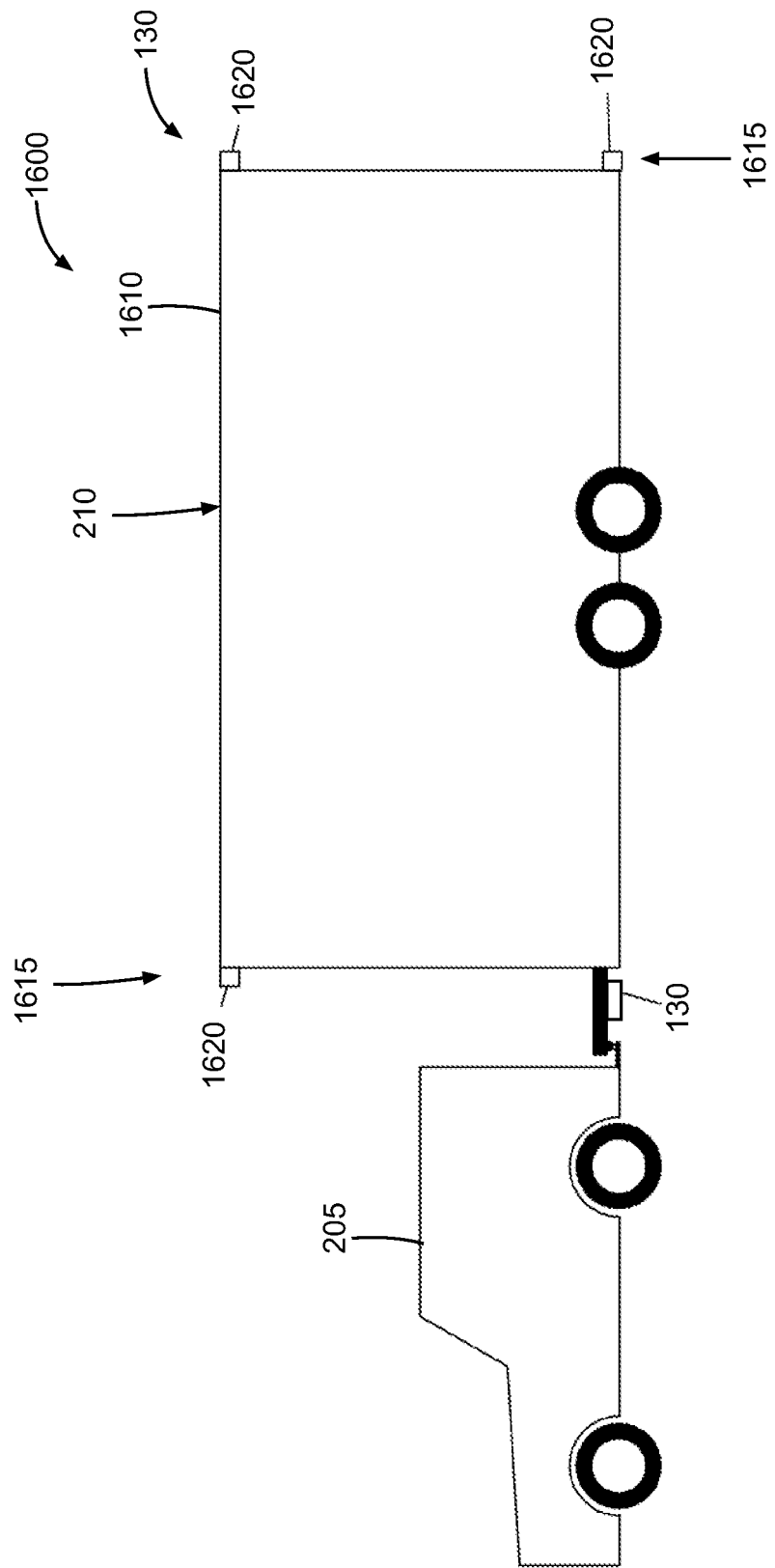
FIG. 16 is a side view of an autobrake sensor system with a parking sensor array.

An autobrake sensor system 1600 that can be incorporated into the vehicle system 100 will now be described with reference to reference to FIG. 16. Like in other examples, the automobile 205 tows the trailer 210 with the tail controller 130 of the control subsystem 115. In this example, the trailer 210 includes an enclosed trailer 1610 with a parking sensor array 1615. The parking sensor array 1615 includes one or more park sensors 1620 mounted around the enclosed trailer 1610 at positions where the enclosed trailer 1610 is likely to hit an object. For instance, the park sensors 1620 can be mounted at the front and rear of the enclosed trailer 1610 as well as near the top of the enclosed trailer 1610. For instance, the park sensors 1620 can be mounted at normal bumper locations as well as high up on the enclosed trailer 1610 to detect and avoid hitting overhanging trees or drive-through signs. The park sensors 1620 can for example include ultrasonic sensors, light sensors, and/or other types of proximity sensors. In one embodiment, the park sensors 1620 are battery powered. The park sensors 1620 are designed to be magnetically coupled to the enclosed trailer 1610, and the park sensors 1620 are further configured to communicate wirelessly with the tail controller 130. In another example, the park sensors 1620 are hardwired type sensors that include a CAN interface and draw power from the wires. The park sensors 1620 in the enclosed trailer 1610 are configured to detect object or parking sensor distance, and the enclosed trailer 1610 via the wired or wireless reports directly or indirectly reports the distance information to the head controller 120 and/or tail controller 130. The park sensors 1620 further provide the state of charge for the battery when using a wireless configuration and a watchdog pulse to make sure the particular park sensor 1620 is still working. Moreover, the park sensors 1620 are also able to provide any fault or failure information to the control subsystem 115.

The tail controller 130 can talk to one or more park sensors 1620 distributed around the enclosed trailer 1610, and this parking brake information can be transmitted to the head controller 120 and user for display or further processing. When a wireless connection is used, the park sensors 1620 can report this information to the tail controller 130 through the wireless interface 645 (FIG. 6) which in turn transmits the information to the head controller 120. In another variation, the wireless interface 360 in the head unit 116 directly receives the wireless information from the park sensors 1620. When the park sensors 1620 are hardwired, the information is directly sent to the tail unit 118, and if needed, the tail controller 130 can retransmit the information to the head controller 120 in the automobile 205. The I/O devices 125 of the head unit 116 for example can provide distance and/or collision avoidance warnings to the driver.

In other variations, the information from the park sensors 1620 is tied directly to the tail braking system 160 of the automobile 205. In this case, the user through the I/O devices 125 designates a distance range for the control subsystem 115 to automatically apply the brakes 255 of the trailer 210 (e.g., 1 or 2 meters). Alternatively or additionally, the control subsystem 115 can also automatically apply the brakes 222 of the automobile 205 at the same time. When moving in a certain travelling direction (i.e., forward or reverse), the control subsystem 115 determines the distance of objects for the park sensors 1620 facing the travelling direction. When the object distance from these park sensors 1620 is at or less than the designated safety distance range, the head controller 120 and/or tail controller 130 at least automatically engages the brakes 255 of the trailer 210, and in some cases, the head controller 120 automatically engages the brakes 222 of the automobile 205. This feature can be especially helpful when backing up the trailer 210. When the brakes are automatically applied, the user can intervene either by overriding the automatic brake command through the CAN 135 and/or by depressing the brake pedal of the automobile 205 for a few seconds (e.g., 5 seconds) and then releasing the brake pedal.

Figure 17:
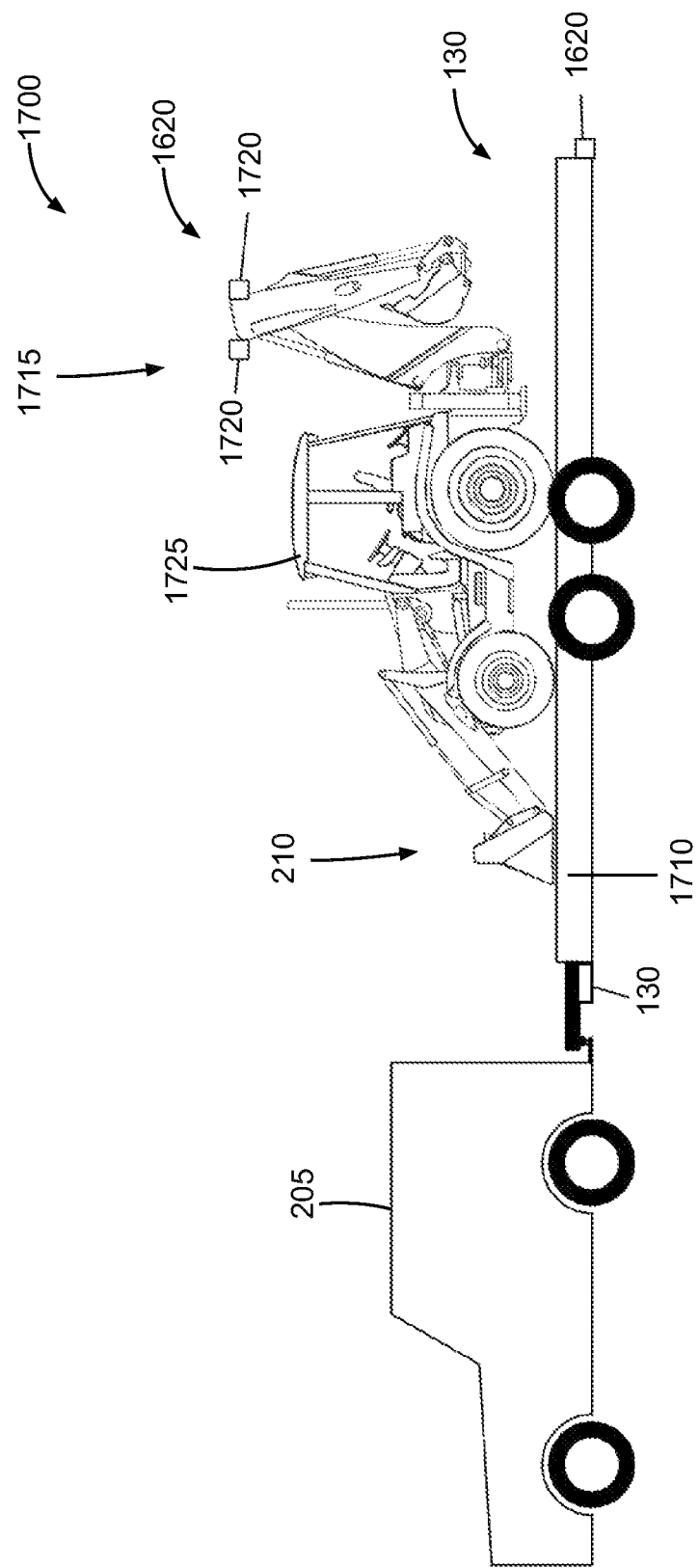
FIG. 17 is a side view of an autobrake sensor system with a parking sensor array.

Sometimes cargo on trailers can be vulnerable to striking objects while the trailer is moving. For example, equipment on flatbed trailers can be especially vulnerable. FIG. 17 depicts an autobrake sensor system 1700 for handling such situations. As can be seen, the autobrake sensor system 1700 includes the automobile 205 towing the trailer 210. In the illustrated example, the trailer 210 includes an open trailer 1710 such as a flatbed type trailer. The open trailer 1710 includes a parking sensor array 1715 that includes the park sensors 1620 and one or more magnetic park sensors 1720 magnetically attached to cargo 1725, such as a backhoe, carried by the open trailer 1710. In the illustrated example, the park sensors 1620 attached to the open trailer 1710 are hardwired connected to the tail controller 130, and the magnetic park sensors 1720 on the cargo 1725 are wirelessly connected to the tail controller 130. The magnetic park sensors 1720 include a permanent magnet for attaching to the cargo 1725, a portable power source, like a battery, and a wireless transceiver. The magnet allows the magnetic park sensors 1720 to be temporarily attached to the cargo 1725 when carried on the open trailer 1710, and the magnetic park sensors 1720 can be easily removed and reused once the cargo 1725 is offloaded from the open trailer 1710. When the cargo is made of non-magnetically attractive materials, the magnetic park sensors 1720 can be temporarily attached in other ways such as through straps and hook-and-loop fasteners.

Backup cameras have helped the trailer backup process greatly, and audible or other signals resulting from the park sensors 1620 allows the driver to focus on other things. As mentioned above the parking sensor array 1615 provides a distance indicator that shows the driver how much farther the automobile 205 can go back before a collision. However, trailer jackknifing during turning is always a concern during any turns, especially when backing up the trailer 210. The trailer 210 tends to jackknife when the trailer 210 turns so far with respect to the automobile 205 that the automobile 205 and trailer 210 hit. Due to the kinematics involved with backing up the trailer 210, even by varying the turning angle by just a few degrees, jackknifing can occur very quickly. The control subsystem 115 is able to determine the relative angle between the automobile 205 and trailer 210 through the orientation measurements from the head IMU 122 and tail IMU 132. By measuring the respective angle with the head IMU 122 and tail IMU 132, the angle between the automobile 205 and trailer 210 can be calculated, and the user can be warned through the I/O devices 125. When backing up the trailer 210, there is a point where the automobile 205 needs to pull forward in order to get the trailer 210 back to center. Based on the measurements from the head IMU 122 and tail IMU 132, the head unit 116 is able to dynamically calculate the relative angle between the automobile 205 and trailer 210 and indicate to the user through the I/O devices 125 when the automobile 205 needs to pull forward in order to center the trailer 210. With this technique, the user knows if they can recover from a potential jackknifing issue, or if the users needs to pull the automobile 205 forward and start over.

In other situations, accidents can occur when the trailer 210 and the cargo 1725 are not properly secured. Returning to FIG. 16, the tail controller 130, such as the park sensors 1620, can be mounted to or by the door of the enclosed trailer 1610 to detect when the door is open or unlocked. Similarly, the tail controller 130 can be used to detect when a ramp is deployed for the open trailer 1710 in FIG. 7. In one form, these tail controller 130 can include a switch, a wireless transceiver (e.g., with Bluetooth® LE), and a portable power source such as a battery. When an open switch or other condition is detection (e.g., the door is open), the tail controller 130 will communicate this status back to directly or indirectly to the tail controller 130, the head controller 120, and/or a mobile device of the user to alert the user of the issue.

As mentioned before, accidents can occur when the cargo 1725 is not properly secured to the open trailer 1710. Due to bumps and other jarring motions, the cables and other webbing used to tie down the cargo 1725 can become loose. Referring to FIG. 18, a unique lanyard 1800 has been developed for use in conjunction with the control subsystem 115 to detect when cargo 1725 becomes loose in the trailer 210. As shown, the lanyard 1800 includes a first hook 1805 and a second hook 1810 located at opposite ends of the lanyard 1800. The first hook 1805 and second hook 1810 are used to hook or otherwise secure the ends of the lanyard 1800 to the trailer 210 or other relatively fixed structure in the trailer 210. It should be recognized that other securing structures, such as clasps, can be used alternatively or additionally to the first hook 1805 and second hook 1810 for securing the lanyard 1800. The lanyard 1800 further includes a retractable web 1815 that is connected to the first hook 1805. The retractable web 1815 is able to extend or retract from a retractor 1820. In one form, the retractable web 1815 can be replaced with a string or cable. The retractable web 1815 is able to extend and retract from the retractor 1820 to compensate for different sizes of cargo 1725 and/or different packing arrangements within the automobile 205. The retractor 1820 is spring biased so that the retractable web 1815 remains tight. Alternatively or additionally, the retractor 1820 can include a locking mechanism for securing the retractable web 1815 at a fixed length or to prevent the retractable web 1815 from extending further. The retractor 1820 is connected to a switch 1825. Among other things, the switch 1825 in one example includes a portable power source, such as a battery, and a wireless transceiver for communicating with the control subsystem 115. In another example, the switch 1825 is hardwired with the tail controller 130 so as to receive power and communicate with the tail controller 130.

As shown in FIG. 18, the switch 1825 has one or more magnets 1830. A button 1835 of a switch body 1840 is received in the switch 1825. The second hook 1810 is mounted to the switch body 1840. All or part of the switch body 1840 is made of magnetic, ferromagnetic, and/or ferrimagnetic material that causes the switch body 1840 to be magnetically attracted to the magnets 1830 of the switch 1825. In one form, the switch body 1840 is at least in part made of steel or iron, but the switch body 1840 can be made from other materials. The button 1835 helps to align or orient the switch body 1840 with the switch 1825. Once the button 1835 is received in the switch 1825, the switch 1825 and switch body 1840 are magnetically clamped together. When the switch 1825 and switch body 1840 start to or become separated, the switch 1825 sends a signal to the head controller 120 and/or tail controller 130 that provides an alert of a potential issue. The open condition between the switch 1825 and switch body 1840 can be detected in a number of ways, such as through an open electrical circuit and/or through inductive or capacitive measurement techniques, to name just a few examples.

In another example, a hard-wired version of the lanyard 1800 can be used. In this case, the retractable web 1815 includes at least two electrically conductive wires. In one form, the switch 1825 detects the spool being pulled based on the overall resistance of the wires in the retractable web 1815. The retractor 1820 has contacts for the wires at or near the exit opening of the retractor 1820 where the wires are electrically connected. As the retractable web 1815 extends from the retractor 1820, the resistance becomes larger. The switch 1825 can have a measured resistance range for sending an alert. In another variation, the wires in the retractable web 1815 form a closed circuit when the switch body 1840 is secured to the switch 1825. Once the switch body 1840 separates from the switch 1825, the circuit opens, and the lanyard 1800 notifies the control subsystem 115.

A technique for using the lanyard 1800 will now be described with reference to the open trailer 1710 in FIG. 17, but it should be recognized that the lanyard 1800 can be used with other types of tail vehicles 110 and/or trailers 210. During use, the retractable web 1815 of the lanyard 1800 is stretched across the cargo bed of the open trailer 1710 and wrapped over or around the cargo 1725. Before, during, or afterwards, the first hook 1805 and second hook 1810 are hooked to the open trailer 1710. The retractable web 1815 is pulled tight by the spring in the retractor 1820 and locked into place by the locking device in the retractor 1820. The locking device prevents the retractable web 1815 from further extending. The button 1835 of the switch body 1840 is inserted into the switch 1825, and the switch 1825 and switch body 1840 are magnetically clamped together by the magnets 1830. When the switch 1825 is pulled, the switch 1825 is pulled away from the switch body 1840 so as to cause the switch 1825 to detect an open condition. In response, the switch 1825 sends an alert to the head controller 120 and/or tail controller 130 so as to alert the driver or other user, such as via the I/O devices 125, that the cargo 1725 has shifted or moved in the open trailer 1710. At that point, the user can take appropriate actions to correct the issue.

Trailer and cargo theft or unauthorized use is always concern. The vehicle system 100 has been developed to address these as well as other issues. Through the I/O devices 125, the user may enable the security function for the head unit 116 in the automobile 205 and/or the tail unit 118 on the automobile 205 such as by pressing a security arm button. For example, when the security protocol is enabled, as soon as the automobile 205 in FIG. 2 is powered by any of the wires, such as power for the tail braking system 160, lights 170, or charging, the tail unit 118 will wake up and try to establish communication with the head unit 116. Assuming the tail controller 130 detects the head unit 116, the tail unit 118 will send out a seed from the security key generator 640 (FIG. 6). Upon receiving the key seed, the head controller 120 via the security key generator 355 in FIG. 3 will return a key to the head controller 120 in the tail unit 118. The processor 610 through the security key generator 640 in the tail controller 130 will then determine whether the correct key has been returned based on any variety of public-key or asymmetric cryptography techniques. Once properly verified, the resulting key is then set in the head controller 120 when the security is set. On the other hand, if an incorrect key is returned or the head controller 120 is not detected, the tail controller 130 will go in to an alarm mode. A similar security approach can be used for the head controller 120 in the automobile 205. In one example, the keys are generated via 4 k RSA encryption on a web server owned by the manufacturer of the control subsystem 115. This key generation feature will also facilitate administration of various devices of the control subsystem 115 and fleet management as well as help verify proper changes of ownership. For example, the tail unit 118 can be configured to talk to multiple head unit 116 so that a construction company with for example five (5) trucks and eight (8) trailers can use them interchangeably.

Depending on the user and other settings, once in the alarm mode, the tail unit 118 can perform any number of pre-programmed actions. For example, the tail controller 130 can blink the lights 170 with a code, such as a Morse code "SOS" or other pattern, or otherwise change the function of the lights 170 (e.g., turn selected ones off). When below a certain speed threshold (e.g., at speeds no more than 5 miles per hour or 8 kilometers [km] per hour), the tail unit 118 in other examples locks the brakes 255 in the tail braking system 160 to prevent the automobile 205 from moving further. In still yet other examples, the tail controller 130 is configured to emit an audible car alarm sound through a speaker and/or emit typical alarm light patterns from the lights 170. Any number of combination of these as well as other approaches can be used.

In one embodiment, the tail controller 130 is programmed to start these alarm or alert functions after the automobile 205 travels a specified distance, such as after moving vehicle system 100 meters or 1 km. Assuming the automobile 205 is unattended when stolen, if these alerts were immediately triggered, there is a risk that the thief would cut wires or otherwise disable the tail unit 118. By delaying, there is a greater chance that the alerts will be seen when the automobile 205 is driven in public. For example, a police officer may then notice the blinking pattern of the lights 170 when the automobile 205 is driven down the road by the thief. The alerts created by the tail unit 118 can be especially helpful at filling stations or rest stops. For instance, video footage at these locations can show the blinking pattern so as to associate the theft with a particular suspect. Moreover, the brakes 255 of the automobile 205 can lock up when the thief tries to pull away from the station or rest stop. The video footage of the automobile 205 with the blinking lights 170 and/or locked brakes 255 can be also associated with any credit card purchases.

Glossary of Terms

The language used in the claims and specification is to only have its plain and ordinary meaning, except as explicitly defined below. The words in these definitions are to only have their plain and ordinary meaning. Such plain and ordinary meaning is inclusive of all consistent dictionary definitions from the most recently published Webster's dictionaries and Random House dictionaries. As used in the specification and claims, the following definitions apply to these terms and common variations thereof identified below.

"Aftermarket Product" generally refers to one or more parts and/or accessories used in repair and/or enhancement of a product already made and sold by an Original Equipment Manufacturer (OEM). For example, aftermarket products can include spare parts, accessories, and/or components for motor vehicles.

"Brake" generally refers to a device for arresting and/or preventing the motion of a mechanism usually via friction, electromagnetic, and/or other forces. Brakes for example can include equipment in automobiles, bicycles, or other vehicles that are used to slow down and/or stop the vehicle. In other words, a brake is a mechanical device that inhibits motion by absorbing energy from a moving system. The brake can be for example used for slowing or stopping a moving vehicle, wheel, and/or axle, or to prevent its motion. Most often, this is accomplished by friction. Types of brakes include frictional, pressure, and/or electromagnetic type braking systems. Frictional brakes for instance can include caliper, drum, and/or disc drakes.

"Cargo" or "Cargo Items" generally refer to goods or other physical objects that are typically carried or otherwise transported on vehicles, such as on trucks, ships, aircraft, spacecraft, and/or motor vehicles. The cargo items can be unpackaged or packaged, such as in boxes, bags, bales, containers, barrels, and tanks, to name just a few examples.

"Chassis" generally refers to an internal frame and/or supporting structure that supports an external object, body, and/or housing of the vehicle and/or electronic device. In one form, the chassis can further provide protection for internal parts of the vehicle and/or electronic device. By way of non-limiting examples, a chassis can include the underpart of a vehicle, including the frame on which the body is mounted. In an electronic device, the chassis for example includes a frame and/or other internal supporting structure on which one or more circuit boards and/or other electronics are mounted.

"Controller" generally refers to a device, using mechanical, hydraulic, pneumatic electronic techniques, and/or a microprocessor or computer, which monitors and physically alters the operating conditions of a given dynamical system. In one nonlimiting example, the controller can include an Allen Bradley brand Programmable Logic Controller (PLC). A controller may include a processor for performing calculations to process input or output. A controller may include a memory for storing values to be processed by the processor, or for storing the results of previous processing. A controller may also be configured to accept input and output from a wide array of input and output devices for receiving or sending values. Such devices include other computers, keyboards, mice, visual displays, printers, industrial equipment, and systems or machinery of all types and sizes. For example, a controller can control a network or network interface to perform various network communications upon request. The network interface may be part of the controller, or characterized as separate and remote from the controller. A controller may be a single, physical, computing device such as a desktop computer, or a laptop computer, or may be composed of multiple devices of the same type such as a group of servers operating as one device in a networked cluster, or a heterogeneous combination of different computing devices operating as one controller and linked together by a communication network. The communication network connected to the controller may also be connected to a wider network such as the Internet. Thus a controller may include one or more physical processors or other computing devices or circuitry, and may also include any suitable type of memory. A controller may also be a virtual computing platform having an unknown or fluctuating number of physical processors and memories or memory devices. A controller may thus be physically located in one geographical location or physically spread across several widely scattered locations with multiple processors linked together by a communication network to operate as a single controller. Multiple controllers or computing devices may be configured to communicate with one another or with other devices over wired or wireless communication links to form a network. Network communications may pass through various controllers operating as network appliances such as switches, routers, firewalls or other network devices or interfaces before passing over other larger computer networks such as the Internet. Communications can also be passed over the network as wireless data transmissions carried over electromagnetic waves through transmission lines or free space. Such communications include using WiFi or other Wireless Local Area Network (WLAN) or a cellular transmitter/receiver to transfer data.

"Controller Area Network" or "CAN" generally refers to a vehicle bus standard designed to allow microcontrollers, sensors, and/or other devices to communicate with each other in applications without necessarily a host computer. CAN systems include a message-based protocol, designed originally for multiplex electrical wiring within automobiles, but is also used in many other contexts. A vehicle with a CAN system may normally, but not always, includes multiple Electronic Control Units (ECUs) which can be also called nodes. These ECUs can include Engine Control Modules (ECMs) and Transmission Control Modules (TCMs) as well as other control units such as for airbags, antilock braking/ABS, cruise control, electric power steering, audio systems, power windows, doors, mirror adjustment, battery and/or hybrid/electric recharging systems, to name just a few. A CAN includes a multi-master serial bus standard for connecting ECUs. The complexity of the ECU or node can range from a simple Input/Output (I/O) device up to an embedded computer with a CAN interface and software. The ECU or node can also act as a gateway allowing a general purpose computer to communicate over an interface, such as via a USB and/or Ethernet port, to the devices on the CAN network. Each ECU usually, but not always, includes a central processing unit, a CAN controller, and transceiver. The CAN systems can include low speed CAN (128 Kbps) under the ISO 11898-3 standard and high speed CAN (512 Kbps) under the ISO 11898-2 standard.

"Couple" or "Coupled" generally refers to an indirect and/or direct connection between the identified elements, components, and/or objects. Often the manner of the coupling will be related specifically to the manner in which the two coupled elements interact.

"Electronic Control Unit (ECU)" or "Electronic Control Module (ECM)" generally refers to an embedded system in electronics of a vehicle that controls one or more electrical systems and/or subsystems of the vehicle. Usually, but not always, ECUs communicate over a Controller Area Network (CAN) and can act as nodes over the CAN. The complexity of the ECU or node can range from a simple Input/Output (I/O) device up to an embedded computer with a CAN interface and software. The ECU or node can also act as a gateway allowing a general purpose computer to communicate over an interface, such as via a USB and/or Ethernet port, to the devices on the CAN network. Each ECU usually, but not always, includes a central processing unit, a CAN controller, and a transceiver. These ECUs can for instance include Engine Control Modules (ECMs) and Transmission Control Modules (TCMs) as well as other control units such as for airbags, antilock braking/ABS, cruise control, electric power steering, audio systems, power windows, doors, mirror adjustment, battery and/or hybrid/electric recharging systems, to name just a few. By way of nonlimiting examples, types of ECUs can include ECMs, TCMs, Powertrain Control Module (PCMs), Brake Control Modules (BCMs or EBCMs), Central Control Modules (CCMs), Central Timing Modules (CTMs), General Electronic Modules (GEMs), Body Control Modules (BCMs), and/or Suspension Control Modules (SCMs), to name just a few.

"Frame" generally refers to a structure that forms part of an object and gives strength and/or shape to the object.

"Inertial Measurement Unit" or "IMU" generally refers to a device that measures and reports a body's specific force, angular rate, and sometimes the magnetic field surrounding the body. The IMU typically, but not always, includes one or more accelerometers and gyroscopes, and sometimes magnetometers when the surrounding magnetic fields are measured. IMUs are typically (but not always) self-contained systems that measure linear and angular motion usually with a triad of gyroscopes and triad of accelerometers. An IMU can either be gimballed or strapdown, outputting the integrating quantities of angular velocity and acceleration in the sensor/body frame. They are commonly referred to in literature as the rate-integrating gyroscopes and accelerometers. IMUs typically can be used in a wide variety of circumstances such as to maneuver vehicles, aircraft, and/or spacecraft as well as in cellphones and virtual reality glasses. The accelerometers in IMUs can include mechanical and/or electronic type accelerometers, and the gyroscopes in IMUs can include mechanical and/or electronic type gyroscopes.

"Input/Output (I/O) Device" generally refers to any device or collection of devices coupled to a computing device that is configured to receive input and deliver the input to a processor, memory, or other part of the computing device and/or is controlled by the computing device to produce an output. The I/O device can include physically separate input and output devices, or the input and output devices can be combined together to form a single physical unit. Such input devices of the I/O device can include keyboards, mice, trackballs, and touch sensitive pointing devices such as touchpads or touchscreens. Input devices also include any sensor or sensor array for detecting environmental conditions such as temperature, light, noise, vibration, humidity, and the like. Examples of output devices for the I/O device include, but are not limited to, screens or monitors displaying graphical output, a projecting device projecting a two-dimensional or three-dimensional image, or any kind of printer, plotter, or similar device producing either two-dimensional or three-dimensional representations of the output fixed in any tangible medium (e.g., a laser printer printing on paper, a lathe controlled to machine a piece of metal, or a three-dimensional printer producing an object). An output device may also produce intangible output such as, for example, data stored in a database, or electromagnetic energy transmitted through a medium or through free space such as audio produced by a speaker controlled by the computer, radio signals transmitted through free space, or pulses of light passing through a fiber-optic cable.

"Magnet" generally refers to a material or object that produces a magnetic field external to itself. Types of magnets include permanent magnets and electromagnets. By way of non-limiting examples, magnets in certain circumstances are able to attract (or repel) objects such as those made of iron or steel.

"Memory" generally refers to any storage system or device configured to retain data or information. Each memory may include one or more types of solid-state electronic memory, magnetic memory, or optical memory, just to name a few. Memory may use any suitable storage technology, or combination of storage technologies, and may be volatile, nonvolatile, or a hybrid combination of volatile and nonvolatile varieties. By way of non-limiting example, each memory may include solid-state electronic Random Access Memory (RAM), Sequentially Accessible Memory (SAM) (such as the First-In, First-Out (FIFO) variety or the Last-In-First-Out (LIFO) variety), Programmable Read Only Memory (PROM), Electronically Programmable Read Only Memory (EPROM), or Electrically Erasable Programmable Read Only Memory (EEPROM).

Memory can refer to Dynamic Random Access Memory (DRAM) or any variants, including Static Random Access Memory (SRAM), Burst SRAM or Synch Burst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM).

Memory can also refer to non-volatile storage technologies such as Non-Volatile Read Access memory (NVRAM), flash memory, non-volatile Static RAM (nvSRAM), Ferroelectric RAM (FeRAM), Magnetoresistive RAM (MRAM), Phase-change RAM (PRAM), Conductive-Bridging RAM (CBRAM), Silicon-Oxide-Nitride-Oxide-Silicon (SONOS), Resistive RAM (RRAM), Domain Wall Memory (DWM) or "Racetrack" memory, Nano-RAM (NRAM), or Millipede memory. Other nonvolatile types of memory include optical disc memory (such as a DVD or CD ROM), a magnetically encoded hard disc or hard disc platter, floppy disc, tape, or cartridge media. The concept of a "memory" includes the use of any suitable storage technology or any combination of storage technologies.

"Network" or "Computer Network" generally refers to a telecommunications network that allows computers to exchange data. Computers can pass data to each other along data connections by transforming data into a collection of datagrams or packets. The connections between computers and the network may be established using either cables, optical fibers, or via electromagnetic transmissions such as for wireless network devices.

Computers coupled to a network may be referred to as "nodes" or as "hosts" and may originate, broadcast, route, or accept data from the network. Nodes can include any computing device such as personal computers, phones, and servers as well as specialized computers that operate to maintain the flow of data across the network, referred to as "network devices". Two nodes can be considered "networked together" when one device is able to exchange information with another device, whether or not they have a direct connection to each other.

Examples of wired network connections may include Digital Subscriber Lines (DSL), coaxial cable lines, or optical fiber lines. The wireless connections may include BLUETOOTH®, Worldwide Interoperability for Microwave Access (WiMAX), infrared channel or satellite band, or any wireless local area network (Wi-Fi) such as those implemented using the Institute of Electrical and Electronics Engineers' (IEEE) 802.11 standards (e.g. 802.11(a), 802.11(b), 802.11(g), or 802.11(n) to name a few). Wireless links may also include or use any cellular network standards used to communicate among mobile devices including 1G, 2G, 3G, or 4G. The network standards may qualify as 1G, 2G, etc. by fulfilling a specification or standards such as the specifications maintained by the International Telecommunication Union (ITU). For example, a network may be referred to as a "3G network" if it meets the criteria in the International Mobile Tel (IMT-2000) specification regardless of what it may otherwise be referred to. A network may be referred to as a "4G network" if it meets the requirements of the International Mobile Telecommunications Advanced (IMTAdvanced) specification. Examples of cellular network or other wireless standards include AMPS, GSM, GPRS, UMTS, LTE, LTE Advanced, Mobile WiMAX, and WiMAX-Advanced.

Cellular network standards may use various channel access methods such as FDMA, TDMA, CDMA, or SDMA. Different types of data may be transmitted via different links and standards, or the same types of data may be transmitted via different links and standards.

The geographical scope of the network may vary widely. Examples include a Body Area Network (BAN), a Personal Area Network (PAN), a Local-Area Network (LAN), a Metropolitan Area Network (MAN), a Wide Area Network (WAN), or the Internet.

A network may have any suitable network topology defining the number and use of the network connections. The network topology may be of any suitable form and may include point-to-point, bus, star, ring, mesh, or tree. A network may be an overlay network which is virtual and is configured as one or more layers that use or "lay on top of" other networks.

A network may utilize different communication protocols or messaging techniques including layers or stacks of protocols. Examples include the Ethernet protocol, the Internet protocol suite (TCP/IP), the ATM (Asynchronous Transfer Mode) technique, the SONET (Synchronous Optical Networking) protocol, or the SDEl (Synchronous Digital Elierarchy) protocol. The TCP/IP Internet Protocol suite may include the application layer, transport layer, Internet layer (including, e.g., IPv6), or link layer.

"Original Equipment Manufacturer" or "OEM" generally refers to an organization that makes finished devices from component parts bought from other organizations that are usually sold under their own brand in a consumer or commercial market.

"Powertrain" or "Powerplant" generally refers to devices and/or systems used to transform stored energy into kinetic energy for propulsion purposes. The powertrain can include multiple power sources and can be used in non-wheel-based vehicles. By way of nonlimiting examples, the stored energy sources can include chemical, solar, nuclear, electrical, electrochemical, kinetic, and/or other potential energy sources. For example, the powertrain in a motor vehicle includes the devices that generate power and deliver the power to the road surface, water, and/or air. These devices in the powertrain include engines, motors, transmissions, drive shafts, differentials, and final drive components (e.g., drive wheels, continuous tracks, propeller, thrusters, etc.).

"Processor" generally refers to one or more electronic components configured to operate as a single unit configured or programmed to process input to generate an output. Alternatively, when of a multi-component form, a processor may have one or more components located remotely relative to the others. One or more components of each processor may be of the electronic variety defining digital circuitry, analog circuitry, or both. In one example, each processor is of a conventional, integrated circuit microprocessor arrangement, such as one or more PENTIUM, i3, i5 or i7 processors supplied by INTEL Corporation of 2200 Mission College Boulevard, Santa Clara, Calif. 95052, USA. In another example, the processor uses a Reduced Instruction Set Computing (RISC) architecture, such as an Advanced RISC Machine (ARM) type processor developed and licensed by ARM Holdings of Cambridge, United Kingdom. In still yet other examples, the processor can include a Central Processing Unit (CPU) and/or an Accelerated Processing Unit (APU), such as those using a K8, K10, Bulldozer, Bobcat, Jaguar, and Zen series architectures, supplied by Advanced Micro Devices, Inc. (AMD) of Santa Clara, Calif.

Another example of a processor is an Application-Specific Integrated Circuit (ASIC). An ASIC is an Integrated Circuit (IC) customized to perform a specific series of logical operations for controlling the computer to perform specific tasks or functions. An ASIC is an example of a processor for a special purpose computer, rather than a processor configured for general-purpose use. An application-specific integrated circuit generally is not reprogrammable to perform other functions and may be programmed once when it is manufactured.

In another example, a processor may be of the "field programmable" type. Such processors may be programmed multiple times "in the field" to perform various specialized or general functions after they are manufactured. A field-programmable processor may include a Field-Programmable Gate Array (FPGA) in an integrated circuit in the processor. An FPGA may be programmed to perform a specific series of instructions which may be retained in nonvolatile memory cells in the FPGA. The FPGA may be configured by a customer or a designer using a Hardware Description Language (HDL). An FPGA may be reprogrammed using another computer to reconfigure the FPGA to implement a new set of commands or operating instructions. Such an operation may be executed in any suitable means such as by a firmware upgrade to the processor circuitry.

Just as the concept of a computer is not limited to a single physical device in a single location, so also the concept of a "processor" is not limited to a single physical logic circuit or package of circuits but includes one or more such circuits or circuit packages possibly contained within or across multiple computers in numerous physical locations. In a virtual computing environment, an unknown number of physical processors may be actively processing data, and the unknown number may automatically change over time as well.

The concept of a "processor" includes a device configured or programmed to make threshold comparisons, rules comparisons, calculations, or perform logical operations applying a rule to data yielding a logical result (e.g. "true" or "false"). Processing activities may occur in multiple single processors on separate servers, on multiple processors in a single server with separate processors, or on multiple processors physically remote from one another in separate computing devices.

"Sensor" generally refers to an object whose purpose is to detect events and/or changes in the environment of the sensor, and then provide a corresponding output. Sensors include transducers that provide various types of output, such as electrical and/or optical signals. By way of nonlimiting examples, the sensors can include pressure sensors, ultrasonic sensors, humidity sensors, gas sensors, motion sensors, acceleration sensors, displacement sensors, force sensors, optical sensors, and/or electromagnetic sensors. In some examples, the sensors include barcode readers, RFID readers, and/or vision systems.

"Substantially" generally refers to the degree by which a quantitative representation may vary from a stated reference without resulting in an essential change of the basic function of the subject matter at issue. The term "substantially" is utilized herein to represent the inherent degree of uncertainty that may be attributed to any quantitative comparison, value, measurement, and/or other representation.

"Tire Pressure Monitoring System" or "TPMS" generally refers to an electronic system designed to monitor air pressure inside pneumatic tires on vehicles. The TPMS can be configured to report real-time tire pressure information of the vehicle, such as via a gauge, a pictogram display, a low-pressure warning light, audible sound, and/or other output device. TPMS can be generally categorized into two different types, direct TPMS (dTPMS) and indirect TPMS (iTPMS). The dTPMS types include pressure sensors mounted on each wheel, either internally or externally to the wheel. The dTPMS sensors physically measure the tire pressure in each tire and for example report the pressure readings to an instrument cluster in the vehicle. The iTPMS types do not use physical pressure sensors but indirectly measure air pressures by monitoring individual wheel rotational speeds and other signals available outside of the tire.

For example, iTPMS types can for example indirectly measure pressure through wheel speed sensors of Antilock Braking Systems (ABS).

"TOAD" generally refers to a "towed" vehicle, regardless of how the vehicle is being towed. A TOAD is also sometimes called a "dinghy."

"Tow Coupler" or "Trailer Coupler" generally refers to a device used to secure a trailer, a towed vehicle, and/or other towed object to a towing vehicle. Typically, but not always, the trailer coupler is coupled to a hitch of the towing vehicle. For example, the trailer coupler can be configured to couple to a hitch ball. Common types of trailer couplers include (but are not limited to) straight tongue couplers, A-frame couplers, adjustable couplers, and fifth wheel-gooseneck couplers. The trailer coupler can include any number of mounting styles. By way of non-limiting examples, the mounting styles can include straight channel, foldaway, round tongue, A-frame, flat mount, adjustable tongue, lunette ring, gooseneck, trigger, thumb, wrap around yoke, and pin mounting styles or mechanisms. The trailer coupler in some instances can further include a trailer jack for lifting the trailer coupler to the proper height for coupling to the hitch.

"Tow Hitch", "Trailer Hitch", or "Hitch" generally refers to a device attached to a chassis of a vehicle for towing another object, such as a trailer, aircraft, wagon, and/or another vehicle, to name just a few examples. Tow hitches are commonly mounted with bolts or other fasteners to the chassis, but in other examples, the tow hitch can be integrally formed with the chassis and/or attached in other ways such as via welding. Typically, but not always, the trailer hitch is coupled to a trailer coupler that is secured to the towed object. There are a number of types of tow hitches. For example, the tow hitch can include receiver type and fixed drawbar type hitches. Receiver type hitches can include a receiver mounted to the chassis and a removable mount that is connected to the receiver. In one form, the receiver is in the form of a receiver tube that defines a receiver opening in which the removable mount is mounted, such as via a bolt or other fastener, and/or otherwise connected. The removable mount can for example include one or more ball mounts, hitch bike racks, cargo carriers, and/or other hitch mounted accessories. Fixed drawbar type hitches are typically, but not always, built as a unitary piece that is mounted to the chassis. The fixed drawbar type hitch normally includes one or more holes for a trailer ball or other mounts. The trailer mounts can for instance take the form of a tow ball to allow swiveling and articulation of a trailer; a knuckle coupling; a tow pin or a tow hook with a trailer loop coupling; and/or a pintle and lunette ring coupling. The tow hitches can for instance include Society of Automotive Engineers (SAE) class I, II, III, IV, and V hitches.

"Trailer" generally refers to an unpowered vehicle towed by another vehicle. For instance, a trailer can include a nonautomotive vehicle designed to be hauled by road, such as a vehicle configured to transport cargo, to serve as a temporary (or permanent) dwelling, and/or acting as a temporary place of business. Some non-limiting examples of trailers include open carts, semi-trailers, boat trailers, and mobile homes, to name a just few. Typically, trailers lack a power train for propelling themselves over long distances and require another powered vehicle to move them. However, trailers may include a power source, such as a battery or generator, for powering auxiliary equipment.

"Vehicle" generally refers to a machine that transports people and/or cargo. Common vehicle types can include land based vehicles, amphibious vehicles, watercraft, aircraft, and space craft. By way of non-limiting examples, land based vehicles can include wagons, carts, scooters, bicycles, motorcycles, automobiles, buses, trucks, semi-trailers, trains, trolleys, and trams. Amphibious vehicles can for example include hovercraft and duck boats, and watercraft can include ships, boats, and submarines, to name just a few examples. Common forms of aircraft include airplanes, helicopters, autogiros, and balloons, and spacecraft for instance can include rockets and rocket powered aircraft. The vehicle can have numerous types of power sources. For instance, the vehicle can be powered via human propulsion, electrically powered, powered via chemical combustion, nuclear powered, and/or solar powered. The direction, velocity, and operation of the vehicle can be human controlled, autonomously controlled, and/or semi-autonomously controlled. Examples of autonomously or semi-autonomously controlled vehicles include Automated Guided Vehicles (AGVs) and drones.

"Web" generally refers to a material made of a network of thread, strings, cords, and/or wires that form openings in-between. In one form, the cords are interlaced or woven together. The interlaced pattern can be uniform or random.

It should be noted that the singular forms "a," "an," "the," and the like as used in the description and/or the claims include the plural forms unless expressly discussed otherwise. For example, if the specification and/or claims refer to "a device" or "the device", it includes one or more of such devices.

It should be noted that directional terms, such as "up," "down," "top," "bottom," "lateral," "longitudinal," "radial," "circumferential," "horizontal," "vertical," etc., are used herein solely for the convenience of the reader in order to aid in the reader's understanding of the illustrated embodiments, and it is not the intent that the use of these directional terms in any manner limit the described, illustrated, and/or claimed features to a specific direction and/or orientation.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by the following claims are desired to be protected. All publications, patents, and patent applications cited in this specification are herein incorporated by reference as if each individual publication, patent, or patent application were specifically and individually indicated to be is incorporated by reference and set forth in its entirety herein.

| Reference Numbers | |
|---|---|
| 100 | vehicle system |
| 105 | tow or head vehicle |
| 110 | tail vehicle |
| 115 | control subsystem |
| 116 | head unit |
| 118 | tail unit |
| 120 | head controller |
| 122 | head IMU |
| 125 | I/O devices |
| 130 | tail controller |
| 132 | tail IMU |
| 135 | CAN |
| 140 | ECUs |
| 145 | powertrain system |
| 150 | head braking system |
| 155 | head connector |
| 160 | tail braking system |
| 165 | sensors |

-continued

| Reference Numbers | |
|---|---|
| 170 | lights |
| 175 | tail connector |
| 200 | automobile-trailer system |
| 205 | automobile |
| 210 | trailer |
| 215 | chassis |
| 220 | wheels |
| 222 | brakes |
| 225 | console blank button interface |
| 230 | head tow hitch |
| 235 | tow ball |
| 237 | wiring harness cable |
| 240 | trailer body |
| 245 | trailer frame |
| 250 | trailer wheels |
| 255 | brakes |
| 260 | tow coupler |
| 265 | wheel speed sensors |
| 270 | TPMS |
| 275 | TPMS sensors |
| 280 t | taillights |
| 285 | side marker lights |
| 290 | tail tow hitch |
| 305 | housing |
| 310 | processor |
| 315 | remote button interface |
| 320 | remote actuation control |
| 325 | remote indicator interface |
| 330 | remote display |
| 335 | local I/O device |
| 340 | IMU interface |
| 345 | vehicle side harness interface |
| 350 | USB display interface |
| 355 | security key generator |
| 360 | wireless interface |
| 365 | high speed network interface |
| 370 | low speed network interface |
| 400 | cabin interior |
| 405 | vehicle console |
| 505 | console buttons |
| 510 | blank console button |
| 605 | tail controller housing |
| 610 | processor |
| 615 | power disconnect monitor |
| 620 | TPMS interface |
| 625 | voltage drop warning system |
| 630 | local I/O device |
| 635 | IMU interface |
| 640 | security key generator |
| 645 | wireless interface |
| 650 | high speed network interface |
| 655 | low speed network interface |
| 660 | tail connector interface |
| 665 | wheel speed sensor interface |
| 670 | supplemental CAN interface |
| 675 | brake actuator system |
| 680 | supplemental brake pass through |
| 700 | wheel speed sensor system |
| 705 | brake harness |
| 710 | brake harness wires |
| 715 | wheel sensor harnesses |
| 720 | wheel sensor harness wires |
| 800 | TPMS system |
| 900 | automobile-trailer system |
| 905 | standard control automobile |
| 910 | first tail control trailer |
| 915 | high speed trailer harness |
| 920 | low speed trailer harness |
| 1000 | automobile-trailer system |
| 1005 | head control automobile |
| 1010 | first standard control trailer |
| 1100 | automobile-trailer system |
| 1200 | automobile-trailer system |
| 1210 | second standard control trailer |
| 1215 | supplemental trailer harness |
| 1300 | automobile-trailer system |
| 1310 | second tail control trailer |

| Reference Numbers | |
|---|---|
| 1400 | automobile-trailer system |
| 1410 | third trail control trailer |
| 1505 | power monitor |
| 1510 | head vehicle power sensor line |
| 1515 | tail vehicle power sensor line |
| 1520 | head vehicle voltage regulator |
| 1525 | tail vehicle voltage regulator |
| 1600 | autobrake sensor system |
| 1610 | enclosed trailer |
| 1615 | parking sensor array |
| 1620 | park sensors |
| 1700 | autobrake sensor system |
| 1710 | open trailer |
| 1715 | parking sensor array |
| 1720 | magnetic park sensors |
| 1725 | cargo |
| 1800 | lanyard |
| 1805 | first hook |
| 1810 | second hook |
| 1815 | retractable web |
| 1820 | retractor |
| 1825 | switch |
| 1830 | magnets |
| 1835 | button |
| 1840 | switch body |

What is claimed is:

1. A vehicle system, comprising:
a control subsystem including
a head unit configured to be installed on a tow vehicle, wherein the head unit includes a head controller, wherein the head unit includes a head Inertial Measurement Unit (IMU) operatively connected to the head controller, wherein the head IMU is configured to measure tow vehicle pitch of the tow vehicle,
a first tail unit configured to be installed on a first trailer that is towed by the tow vehicle, wherein the first tail unit includes a first tail controller, wherein the first tail unit includes a first tail IMU operatively connected to the first tail controller, wherein the first tail IMU is configured to measure first trailer pitch of the first trailer, and
a second tail unit configured to be installed on a second trailer that is towed by the first trailer, wherein the second tail unit includes a second tail controller, wherein the second tail unit includes a second tail IMU operatively connected to the second tail controller;
wherein the head controller and the first tail controller are operatively connected to communicate with one another to control operation of the first trailer;
wherein the first tail controller and the second tail controller are operatively connected to communicate with one another to control operation of the second trailer;
wherein the first tail controller has a first tail connector interface configured to communicate with the second tail controller;
wherein the first tail connector interface includes a first supplemental Controller Area Network (CAN) interface that forms a connection with the second tail controller;
wherein the first supplemental CAN interface is configured to pass through status of the second trailer to the head controller;
wherein the first tail controller has a first tail brake actuator system configured to individually modulate each of first tail brakes for a plurality of first tail wheels on the first trailer;

wherein the second tail controller has a second tail brake actuator system configured to individually modulate each of second tail brakes for a plurality of second tail wheels on the second trailer;

wherein the control subsystem is configured to modulate braking of the first tail brakes and the second tail brakes based on data from the head IMU, the first tail IMU, and the second tail IMU for anti-sway and inverted pendulum control of the first trailer and the second trailer;

wherein the first tail unit has first tail wheel speed sensors operatively connected to the first tail controller to individually measure speed of the first tail wheels;

wherein the second tail unit has second tail wheel speed sensors operatively connected to the second tail controller to individually measure speed of the second tail wheels wherein control subsystem is configured to modulate braking of the first tail brakes and the second tail brakes based on speed data from the first tail wheel speed sensors and the second tail wheel speed sensors;

wherein the first tail controller maintains a database that includes predetermined information about the tow vehicle under various first trailer tongue weights and associated first trailer pitches; and wherein the first tail controller is configured to determine tongue weight of the first tail vehicle based on at least the first trailer pitch from the first IMU and the information on the database.

2. The vehicle system of claim 1, wherein the head unit communicates with the first tail unit through a wired connection.

3. The vehicle system of claim 2, wherein the wired connection includes a standard 4-pin or 7-pin trailer plug connection with overlaying network functions.

4. The vehicle system of claim 1, wherein the head unit communicates with the first tail unit through a wireless connection.

5. The vehicle system of claim 1, wherein the head unit communicates with the first tail unit through low and high speed communication networks.

6. The vehicle system of claim 1, wherein:
the control subsystem includes a low speed network operatively connected between the head unit and the first tail unit; and
the low speed network configured to communicate dynamics, braking, park sensor, and load sensor information between the head unit and the first tail unit.

7. The vehicle system of claim 5, wherein the control subsystem includes a high speed network for camera and radar communication.

8. The vehicle system of claim 5, wherein:
the head unit is configured to automatically detect that the first tail unit is a standard controller; and
the head unit is configured to convert to standard braking operational mode where standard braking signals are sent to the standard controller.

9. The vehicle system of claim 1, wherein the head unit supports blank control button inputs to use as buttons for a visually clean vehicle install.

10. The vehicle system of claim 1, wherein the first tail unit is configured to act as a gateway for other on-trailer devices and other tail units.

11. The vehicle system of claim 1, wherein the head unit is configured to receive trailer dynamics information from the first tail unit.

12. The vehicle system of claim 1, wherein control subsystem has a brake lock test mode for trailer brake force testing, system tuning, and failure testing.

13. The vehicle system of claim 1, wherein the first tail unit includes a parking sensor array for auto-braking.

14. The vehicle system of claim 1, wherein the control subsystem determines trailer ball weight based on vehicle database and gyroscopic data.

15. The vehicle system of claim 1, wherein the first tail unit has a trailer crawl mode for progressively applying the first tail brakes for speed control during steep descents.

16. The vehicle system of claim 1, wherein the first tail unit has automatic power disconnect mode to prevent battery drainage.

17. The vehicle system of claim 1, wherein the control subsystem is configured to alert a user when not properly hitched to the head vehicle.

18. The vehicle system of claim 1, wherein the first tail unit is configured to detect when the head unit is a standard control unit.

19. The vehicle system of claim 1, wherein the first tail IMU includes a nine axes gyroscope and accelerometer.

20. The vehicle system of claim 1, wherein the control subsystem is configured to measure trailer pitch of the first trailer with the first tail IMU.

21. The vehicle system of claim 20, wherein the control subsystem is configured to at least use the pitch data from the first tail IMU to facilitate load leveling of the first trailer.

22. The vehicle system of claim 20, wherein the control subsystem is configured to determine tongue weight at least based on the pitch of the first tail vehicle.

23. The vehicle system of claim 20, wherein the control subsystem is configured to calibrate brake lockup at least based on the pitch of the first trailer.

24. The vehicle system of claim 1, wherein the first tail wheel speed sensors and the second tail wheel speed sensors include Hall effect sensors.

25. The vehicle system of claim 1, wherein the first tail wheel speed sensors and the second tail wheel speed sensors include Tire Pressure Monitoring System (TPMS) sensors.

26. The vehicle system of claim 1, wherein the control subsystem is configured to calibrate brake force for each of the first tail wheels based on wheel speed and brake current.

27. The vehicle system of claim 1, wherein the first tail unit is configured to automatically apply the first tail brakes in a crawl mode.

28. The vehicle system of claim 27, wherein the first tail brakes are applied when a limit in a difference in speed between the tow vehicle and the first tail vehicle is exceeded.

29. The vehicle system of claim 1, wherein the first tail unit includes a security key generator to authenticate the first tail unit.

30. The vehicle system of claim 29, wherein the first tail unit is configured to detect that the head unit is unauthorized.

31. The vehicle system of claim 30, wherein the first tail unit is configured to provide an alert not before travelling a specified distance.

32. The vehicle system of claim 31, wherein the alert includes locking the first tail brakes of the first trailer.

33. The vehicle system of claim 31, wherein the alert includes a specified light blinking pattern by the first trailer.

34. The vehicle system of claim 1, wherein the first tail unit includes a wired interface to allow a user to remotely apply the first tail brakes of the first trailer.

35. The vehicle system of claim 1, wherein the first tail unit includes a tail connector connected to the second tail unit.

36. The vehicle system of claim 1, wherein the first tail unit is mounted to a frame of the first trailer.

37. The vehicle system of claim 1, wherein the control subsystem includes a retractable lanyard remotely located on the first trailer to detect load shifts on the first trailer.

38. The vehicle system of claim 1, wherein the control subsystem is configured to provide a jackknife warning.

39. The vehicle system of claim 1, wherein the head unit is configured to estimate tongue weight based on a head vehicle pitch measurement from the head IMU.

40. The vehicle system of claim 1, wherein:
the head IMU is configured to measure tow vehicle pitch of the tow vehicle;
the first tail IMU is configured to measure first trailer pitch of the first trailer;
the first tail controller is configured to detect under braking and over braking of the first brakes of the first trailer when the first trailer pitch is outside a designated pitch range;
the first tail controller is configured to automatically increase braking force applied by the first brakes when the under braking is detected;
the first tail controller is configured to automatically reduce the braking force applied by the first brakes when the over braking is detected; and
the first tail controller is configured to change the braking force applied by the first brakes during the under braking and the over braking without instructions from the head unit.

41. The vehicle system of claim 40, wherein:
the first tail controller is configured to detect the under braking when the first IMU senses an excessive backward pitch of the first trailer; and
the first tail controller is configured to detect the over braking when the first IMU senses an excessive forward pitch of the first trailer.

42. A method, comprising:
towing a first tail vehicle with a head vehicle, wherein the first tail vehicle has multiple first brakes for first tail wheels, wherein the first tail wheels each have independent first wheel speed sensors, wherein the first tail vehicle has a first tail controller, wherein the first tail controller is operatively coupled to the first wheel speed sensors and the first brakes, wherein the first tail vehicle has a first Inertial Measurement Unit (IMU) operatively coupled to the first tail controller;
towing a second tail vehicle with the first tail vehicle, wherein the second tail vehicle has multiple second brakes for second tail wheels, wherein the second tail wheels each have independent second wheel speed sensors, wherein the second tail vehicle has a second tail controller, wherein the second tail controller is operatively coupled to the second wheel speed sensors and the second brakes, wherein the second tail vehicle has a second IMU operatively coupled to the second tail controller;
monitoring movement of the first tail vehicle with the first IMU;
monitoring movement of the second tail vehicle with the second IMU;
communicating movement, speed, and acceleration data between at least the first tail controller and the second tail controller;
detecting swaying of at least one of the first tail vehicle and the second tail vehicle based on the movement, speed, and acceleration data;
inhibiting swaying and jackknifing of the first tail vehicle and the second tail vehicle independently by independently applying braking forces to each of the first brakes and the second brakes with the first tail controller and the second tail controller;
determining pitch of at least one of the head vehicle and the first tail vehicle with the first IMU; maintaining a database that includes predetermined information about the tow vehicle under various first trailer tongue weights and associated first trailer pitches; and
determining with control subsystem tongue weight of the first tail vehicle based on at least the first trailer pitch data from the first IMU and the information on the database.

43. The method of claim 42, wherein said inhibiting sway occurs in response to said determining the pitch.

44. The method of claim 43, further comprising:
adjusting the brake force applied to each of the second brakes with the second tail controller to prevent lock up based on wheel speed sensed by each of the second wheel speed sensors.

45. The method of claim 42, further comprising:
wherein the head vehicle includes a head IMU;
wherein the head vehicle has head vehicle brakes;
measuring head vehicle pitch of the head vehicle with the head IMU;
measuring first tail vehicle pitch of the first tail vehicle with the first tail IMU; and
maintaining relative pitch of the head vehicle pitch and the first tail vehicle within a designated pitch range to ensure the head vehicle brakes and the first brakes are properly applied.

46. The method of claim 42, further comprising:
wherein the head vehicle includes a head unit;
wherein the head unit include a head IMU;
wherein the head vehicle has head vehicle brakes;
measuring head vehicle pitch of the head vehicle with the head IMU;
measuring first tail vehicle pitch of the first tail vehicle with the first tail IMU;
maintaining relative pitch of the head vehicle pitch and the first tail vehicle within a designated pitch range to ensure the head vehicle brakes and the first brakes are properly applied;
detecting with the head unit excessive forward pitch of the head vehicle based on the head vehicle pitch;
sending instructions from the head unit to the first tail controller to apply greater braking force to the first tail brakes; and
applying the greater braking force to the first tail brakes.

47. The method of claim 42, further comprising:
wherein the head vehicle includes a head unit;
wherein the head unit include a head IMU;
wherein the head vehicle has head vehicle brakes;
measuring head vehicle pitch of the head vehicle with the head IMU;
measuring first tail vehicle pitch of the first tail vehicle with the first tail IMU;
detecting with the first tail controller over braking of the first tail vehicle by determining excessive forward pitch of the first tail vehicle based on the first tail pitch; and
reducing braking force applied by the first brakes automatically via the first tail controller without instructions from the head unit.

* * * * *